(12) United States Patent
Tomita et al.

(10) Patent No.: US 10,159,013 B2
(45) Date of Patent: Dec. 18, 2018

(54) RELAY DEVICE, COMMUNICATION SYSTEM AND COMMUNICATION METHOD

(71) Applicant: FUJITSU LIMITED, Kawasaki-shi, Kanagawa (JP)

(72) Inventors: Tetsuo Tomita, Setagaya (JP); Toshiharu Kawanishi, Kawasaki (JP); Teruyoshi Watanabe, Kawasaki (JP); Masato Katori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 203 days.

(21) Appl. No.: 15/062,032

(22) Filed: Mar. 4, 2016

(65) Prior Publication Data

US 2016/0269937 A1     Sep. 15, 2016

(30) Foreign Application Priority Data

Mar. 9, 2015  (JP) ................. 2015-046246

(51) Int. Cl.
*H04W 28/08* (2009.01)
*H04W 28/02* (2009.01)
*H04L 12/00* (2006.01)
*H04L 12/64* (2006.01)
*H04W 40/22* (2009.01)
(Continued)

(52) U.S. Cl.
CPC ............ *H04W 28/08* (2013.01); *H04B 7/155* (2013.01); *H04L 12/00* (2013.01);
(Continued)

(58) Field of Classification Search
CPC ............... H04W 76/02; H04W 76/046; H04W 72/0406; H04W 72/0453; H04W 52/0212;
(Continued)

(56) References Cited

U.S. PATENT DOCUMENTS

2009/0239477 A1   9/2009   Yamamoto
2011/0128950 A1   6/2011   Tomita et al.
(Continued)

FOREIGN PATENT DOCUMENTS

JP   2009-188551 A   8/2009
JP   2009-231970 A   10/2009
(Continued)

OTHER PUBLICATIONS

Japanese Office Action of related of Japanese Patent Application No. 2015-046246 dated Sep. 25, 2018.

*Primary Examiner* — Awet Haile
(74) *Attorney, Agent, or Firm* — Arent Fox LLP

(57) ABSTRACT

A relay device configured to be coupled to a control device, the control device storing first information indicating a position and second information indicating a characteristic of a wireless device which is to be coupled to the control device, the relay device includes a memory, and a processor coupled to the memory and configured to receive, from the wireless device, device information including performance of the wireless device and installment information including a position where the wireless device is located, transmit to the control device the device information and the installment information, receive a response from the control device when the position where the wireless device is located satisfies the first information and the performance of the wireless device satisfies the second information, and establish a communication link between the wireless device and the control device, after receiving the response from the control device.

22 Claims, 22 Drawing Sheets

(51) Int. Cl.
*H04B 7/155* (2006.01)
*H04W 76/10* (2018.01)

(52) U.S. Cl.
CPC ......... *H04L 12/6418* (2013.01); *H04W 40/22* (2013.01); *H04W 76/10* (2018.02); *H04W 28/0226* (2013.01); *Y02D 70/1262* (2018.01); *Y02D 70/1264* (2018.01); *Y02D 70/39* (2018.01); *Y02D 70/446* (2018.01)

(58) Field of Classification Search
CPC ............. H04W 92/02; H04W 28/0226; H04W 28/08; H04W 40/22; H04L 12/00; H04L 12/6418
See application file for complete search history.

(56) References Cited

U.S. PATENT DOCUMENTS

| | | | | |
|---|---|---|---|---|
| 2011/0275378 | A1* | 11/2011 | Kwon | H04W 72/00 455/437 |
| 2013/0201960 | A1* | 8/2013 | Kim | H04W 72/0446 370/331 |
| 2014/0169264 | A1 | 6/2014 | Katori | |
| 2017/0064698 | A1* | 3/2017 | Fujinami | H04W 24/02 |
| 2017/0156065 | A1* | 6/2017 | Bhattacharjee | H04W 16/18 |

FOREIGN PATENT DOCUMENTS

| | | |
|---|---|---|
| JP | 2011-049784 A | 3/2011 |
| JP | 2011-114689 A | 6/2011 |
| JP | 2014-110574 A | 6/2014 |
| JP | 2014-121054 A | 6/2014 |

\* cited by examiner

FIG. 3

| PARAMETER | | VALUE |
|---|---|---|
| TRANSMISSION SOURCE DEVICE ID | | AID#6 |
| TRANSMISSION DESTINATION DEVICE ID | | AID#0 |
| SIGNAL ID | | SID#1 |
| RE PORT ID | | PID#1 |
| RE DEVICE INFORMATION | USABLE FREQUENCY BAND | 2-2.6GHz |
| | USABLE SYSTEM BANDWIDTH | 5,10,15,20MHz |
| | THE NUMBER OF ANTENNAS | 2 |
| | MAXIMUM TRANSMISSION POWER | 60W |
| | ⋮ | ⋮ |
| RE INSTALLMENT INFORMATION | INSTALLMENT ENVIRONMENT | OUTDOOR |
| | INSTALLMENT POSITION | POS#1 |
| | SECTOR ID | SCID#1 |
| | ⋮ | ⋮ |
| ⋮ | | ⋮ |

FIG. 4

| PARAMETER | VALUE |
|---|---|
| TRANSMISSION SOURCE DEVICE ID | AID#3 |
| TRANSMISSION DESTINATION DEVICE ID | AID#6 |
| SIGNAL ID | SID#2 |
| REC PORT ID | PID#3 |
| ⋮ | ⋮ |

FIG. 5

| PARAMETER | VALUE |
|---|---|
| LINK ID | LID#3 |
| TRANSMISSION SOURCE DEVICE ID | AID#6 |
| TRANSMISSION DESTINATION DEVICE ID | AID#3 |
| SIGNAL ID | SID#3 |
| RE PORT ID | PID#1 |
| REC PORT ID | PID#3 |
| ⋮ | ⋮ |

FIG. 6

| PARAMETER | VALUE |
|---|---|
| SYSTEM BANDWIDTH | 5MHz |
| TRANSMISSION-RECEPTION SYSTEM | TRANSMISSION DIVERSITY |
| ⋮ | ⋮ |

FIG. 9

| PARAMETER | VALUE |
|---|---|
| TRANSMISSION SOURCE DEVICE ID | AID#2 |
| TRANSMISSION DESTINATION DEVICE ID | AID#6 |
| SIGNAL ID | SID#4 |
| RE PORT ID | PID#1 |
| REC PORT ID | PID#2 |
| ⋮ | ⋮ |

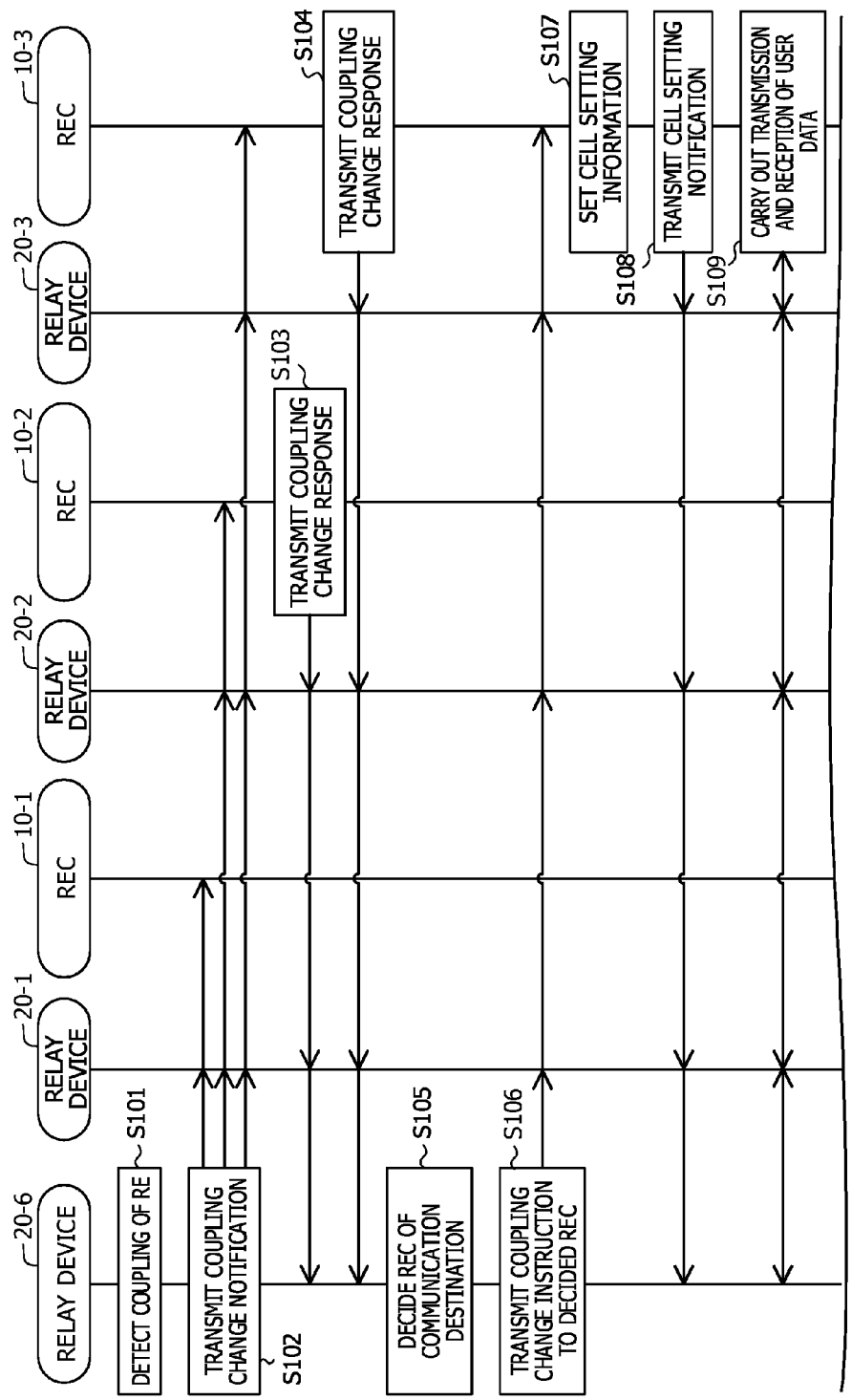

FIG. 18

| PARAMETER | VALUE |
|---|---|
| TRANSMISSION SOURCE DEVICE ID | AID#2 |
| TRANSMISSION DESTINATION DEVICE ID | AID#6 |
| SIGNAL ID | SID#2 |
| REC PORT ID | PID#2 |
| ⋮ | ⋮ |

RELAY DEVICE, COMMUNICATION SYSTEM AND COMMUNICATION METHOD

CROSS-REFERENCE TO RELATED APPLICATION

This application is based upon and claims the benefit of priority of the prior Japanese Patent Application No. 2015-046246, filed on Mar. 9, 2015, the entire contents of which are incorporated herein by reference.

FIELD

The embodiment discussed herein is related to a relay device, a communication system and a communication method.

BACKGROUND

A communication system including plural baseband units (BBU), plural radio remote heads (RRH), and plural relay devices is known.

In a radio communication system, it is often difficult to change the BBU as a communication destination of the RRH. In this case, the communication traffic in a radio area often concentrates on a specific BBU. Therefore, the transmission rate in the radio area often becomes too low if a communication system appropriate to an amount of communication traffic in the radio area and the worst value of the transmission rate between the BBU and the RRH is not prepared. Thus, CAPEX and OPEX often become too high. CAPEX is an abbreviation of capital expenditure. OPEX is an abbreviation of operating expenditure.

Increase in the number of radio areas (in other words, increase in the radio area density) is often carried out along with reduction in size of the radio areas. The radio area density represents the number of radio areas per unit area. As the radio area density increases, the number of BBUs on which the communication traffic concentrates also increases. In other words, as the radio area density increases, the use efficiency of the BBUs and the RRHs lowers. Therefore, in the radio communication system, the communication traffic is distributed by allowing change of the BBU as the communication destination of the RRH. As a result, the use efficiency of the BBUs and the RRHs is enhanced.

The communication system couples the BBUs and the RRHs via plural relay devices. If failure occurs in a BBU as the communication destination of a certain RRH, the communication system switches the communication destination of this RRH to another BBU prescribed in advance.

As one example of the related art, Japanese Laid-open Patent Publication No. 2014-121054, Japanese Laid-open Patent Publication No. 2009-231970, Japanese Laid-open Patent Publication No. 2014-110574, and Japanese Laid-open Patent Publication No. 2011-114689 are known.

SUMMARY

According to an aspect of the invention, a relay device configured to be coupled to a control device, the control device storing first information including a position and second information including a characteristic of a wireless device which is to be coupled to the control device, the relay device includes a memory, and a processor coupled to the memory and configured to receive, from the wireless device, device information including performance of the wireless device and installment information including a position where the wireless device is located, transmit to the control device the device information and the installment information, receive a response from the control device when the position where the wireless device is located satisfies the first information and the performance of the wireless device satisfies the second information, and establish a communication link between the wireless device and the control device, after receiving the response from the control device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a table representing one example of information included in a coupling change notification transmitted by a relay device illustrated in FIG. 1;

FIG. 4 is a table representing one example of information included in a coupling change response transmitted by the relay device illustrated in FIG. 1;

FIG. 5 is a table representing one example of information included in a coupling change instruction transmitted by the relay device illustrated in FIG. 1;

FIG. 6 is a table representing one example of cell setting information set by the REC illustrated in FIG. 1;

FIG. 9 is a table representing one example of information included in a coupling change request transmitted by the relay device illustrated in FIG. 1;

FIG. 15 is a sequence diagram representing one example of an operation of the radio communication system illustrated in FIG. 1;

FIG. 18 is a table representing one example of information included in a coupling change response transmitted by the relay device illustrated in FIG. 1;

DESCRIPTION OF EMBODIMENT

Figure 1:
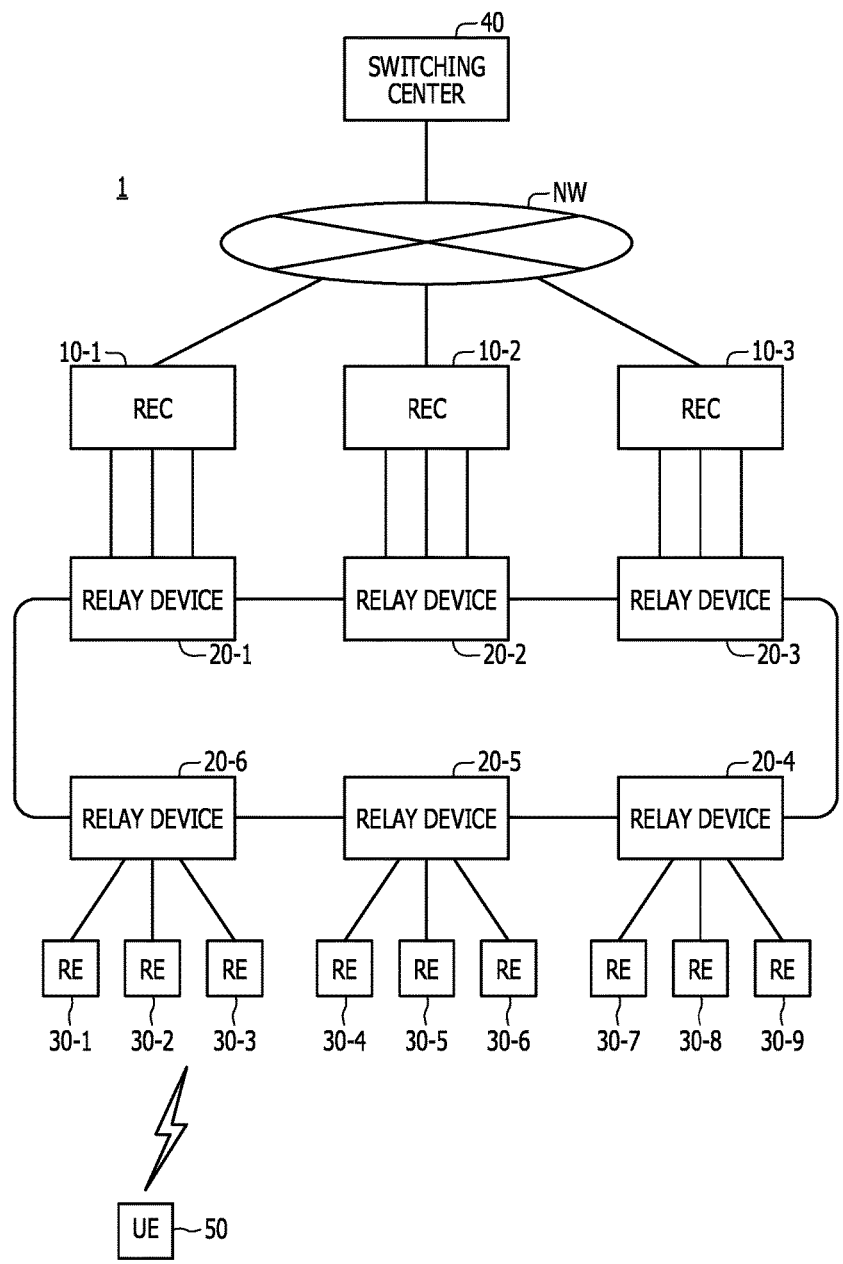
FIG. 1 illustrates one example of a configuration of a radio communication system according to a first embodiment.

In the communication system described above, an RRH is coupled to a port provided on a relay device. Further, the communication system stores the BBUs in an associated relationship with the ports provided on the relay devices and uses a BBU stored in an associated relationship with a port coupled to an RRH as a communication destination of the RRH.

Accordingly, for example, when an RRH is newly coupled to a relay device, the communication system sometimes uses a BBU that is not suitable for the RRH as a communication destination of the RRH.

Further, for example, when the load of a BBU that is the communication destination of an RRH becomes relatively high, the communication system sometimes fails to switch the communication destination of the RRH to another BBU whose load is relatively low.

In this manner, the communication system sometimes fails to establish a communication link between an RRH and a BBU that is suitable for the RRH.

As one aspect, one of the objects of the present embodiment resides in establishment of a communication link between a radio device and a radio control device suitable for the radio device.

An upper limit exists on the transmission rate between relay devices attributed to capacity of a communication path between the relay devices and a processing ability of the relay devices. The transmission rate is an amount of data transmitted per unit time. Therefore, due to new establishment of a communication link, the transmission rate in existing communication links often decreases. Therefore, it becomes more difficult to newly establish a communication link as the sum of the transmission rate in the existing communication links becomes closer to the upper limit of the transmission rate between the relay devices.

Furthermore, for example, in LTE, the transmission rate between the BBU and the RRH is 2.4 Gbps if system bandwidth is 20 MHz, the number of antennas is two and transmission diversity is not executed. LTE is an abbreviation of long term evolution. Therefore, the transmission rate between the BBU and the RRH is comparatively high.

In a radio communication system in which change of the BBU as a communication destination of the RRH is allowed, the number of communication links between the BBU and the RRH passing through a communication network that relays communications between the BBUs and the RRHs easily becomes large. Furthermore, as the number of communication links passing through the communication network that relays communications between the BBUs and the RRHs becomes larger, the transmission rate in the communication network becomes higher. As the transmission rate in the communication network becomes higher, it becomes more difficult to newly establish a communication link.

Furthermore, as the transmission rate in the communication network becomes higher, size of the relay devices forming the communication network becomes larger and a cost of installation of communication cables forming the communication network becomes higher. Therefore, it becomes more difficult to construct the communication network as the transmission rate in the communication network becomes higher.

Incidentally, suppose the case in which a CPRI signal transmitted between the BBU and the RRH is compressed and transmitted. CPRI is an abbreviation of common public radio interface. In this case, as time taken for processing for compression of the signal and extension of the compressed signal (in other words, decompression) becomes longer, the RTT in communications between the BBU and the RRH becomes longer and thus size of the radio area becomes smaller. RTT is an abbreviation of round trip time. As a compression rate of the signal becomes higher, the time taken for the above-described processing becomes longer. Therefore, it is often difficult to sufficiently lower the transmission rate if the size of the radio area is kept.

Incidentally, the transmission rate of the CPRI signal transmitted between the BBU and the RRH is fixedly set to the maximum transmission rate that can be used in the radio communication system. For example, in the LTE, the maximum transmission rate that can be used in the radio communication system is 2.4 Gbps in the case in which the system bandwidth is 20 MHz, the number of antennas is two and transmission diversity is not executed.

For example, if the system bandwidth is 10 MHz, the number of antennas is two and transmission diversity is not executed, 50% of user data included in the CPRI signal is valid data. Furthermore, if the system bandwidth is 10 MHz, the number of antennas is two and transmission diversity is executed for example, 25% of the user data included in the CPRI signal is valid data.

An embodiment will be described below with reference to the drawings. However, the embodiment to be described below is exemplification. Therefore, it is not excluded that various modifications and techniques that are not clearly specified below are applied to the embodiment. In the drawings used in the following embodiment, a part given the same symbol represents the same or similar part unless a change or modification is clearly specified.

First Embodiment (Configuration)

As exemplified in FIG. 1, a radio communication system 1 according to a first embodiment illustratively includes three RECs 10-1 to 10-3, six relay devices 20-1 to 20-6, nine pieces of RE 30-1 to 30-9, a switching center 40, and UE 50. REC is an abbreviation of radio equipment control or radio equipment controller. RE is an abbreviation of radio equipment. UE is an abbreviation of user equipment.

The REC 10-$i$ is represented also as the REC 10 if discrimination is unnecessary. i denotes an integer of 1 to 3. The relay device 20-$j$ is represented also as the relay device 20 if discrimination is unnecessary. j denotes an integer of 1 to 6. The RE 30-$k$ is represented also as the RE 30 if discrimination is unnecessary. The k denotes an integer of 1 to 9.

Each of the numbers of RECs 10, relay devices 20, pieces of RE 30, switching centers 40, and pieces of UE 50 included in the radio communication system 1 may be different from the number exemplified in FIG. 1.

The REC 10 may be expressed as a radio control device or a radio control unit. The RE 30 may be expressed as a radio device or a radio unit. The UE 50 may be expressed as a user terminal, a mobile station, or a radio terminal. In the present example, the REC 10 is a BBU. In the present example, the RE 30 is an RRH. Each of the REC 10 and the RE 30 is one example of a communication device. The UE 50 is one example of radio apparatus.

The radio communication system 1 carries out radio communications in accordance with a given radio communication system between the RE 30 and the UE 50. In the present example, the radio communication system is the LTE system. The radio communication system may be a system different from the LTE system (e.g. system such as W-CDMA or LTE-Advanced). W-CDMA is an abbreviation of wideband code division multiple access.

In the present example, the radio communication system 1 is a 3.9-generation mobile communication system (in other words, 3.9G). The radio communication system 1 may be a 3.5-generation mobile communication system (in other words, 3.5G) or a 4-generation mobile communication system (in other words, 4G).

Each RE 30 forms a cell. The cell is one example of a radio area. The cell may be expressed as a coverage area or a communication area. For example, the cell is a macrocell, microcell, nanocell, picocell, femtocell, home cell, small cell, sector cell, or the like. Each RE 30 carries out radio communications with the UE 50 located in the cell formed by the RE 30.

Each RE 30 is coupled to the relay device 20. In the present example, each RE 30 is coupled to the relay device 20-4, 20-5, or 20-6. Each RE 30 is communicably coupled to the REC 10 coupled to the relay device 20-1, 20-2, or 20-3 different from the relay device 20-4, 20-5, or 20-6 to which the RE 30 is coupled. In other words, each RE 30 is communicably coupled to the REC 10 via the plural relay devices 20.

In the present example, each REC 10 is communicably coupled to a communication network (e.g. core network) NW as illustrated in FIG. 1. Furthermore, each REC 10 is coupled to the relay device 20. In the present example, each REC 10 is coupled to the relay device 20-1, 20-2, or 20-3.

In the present example, the REC 10 and the RE 30 form a base station. The REC 10 and the RE 30 may be expressed as evolved Node B (eNB). Furthermore, the REC 10 and the RE 30 may form an access point or an eNB.

The relay devices 20-1 to 20-6 are coupled into a ring shape. In the present example, each relay device 20-$j$ is coupled to other two relay devices 20-$m$ and 20-$n$. m and n denote integers from 1 to 6 that are different from each other and different from j.

In the present example, each relay device 20 includes three ports to which the RE 30 or the REC 10 is coupled. Each relay device 20 may include two or less or four or more ports.

In the present example, each of the relay devices 20-1 to 20-3 is coupled to one REC 10-1, 10-2, or 10-3. Each of the relay devices 20-1 to 20-3 may be coupled to the plural RECs 10.

The relay device 20-$j$ receives data from the RE 30 or the REC 10 coupled to the relay device 20-$j$ and transmits the received data to the RE 30 or the REC 10 coupled via the other relay devices 20-$m$ and 20-$n$. The relay device 20-$j$ receives data from the RE 30 or the REC 10 coupled via the other relay devices 20-$m$ and 20-$n$ and transmits the received data to the RE 30 or the REC 10 coupled to the relay device 20-$j$.

In other words, the plural relay devices 20-1 to 20-6 relay communications between the REC 10 and the RE 30.

The UE 50 carries out radio communications with the RE 30 forming a cell in which this UE 50 is located by using radio resources provided in this cell. For example, the UE 50 is a mobile phone, smartphone, sensor, meter (measure), or the like. The UE 50 may be carried by a user or be mounted on a moving body such as a vehicle or be fixed.

The switching center 40 is communicably coupled to the communication network NW. In the present example, the switching center 40 includes MME, S-GW, and P-GW. MME is an abbreviation of mobility management entity. S-GW is an abbreviation of serving gateway. P-GW is an abbreviation of packet data network gateway. The switching center 40 may be formed by plural information processing devices.

(Configuration; REC)

Next, the configuration of the REC 10-$i$ will be described.

Figure 2:
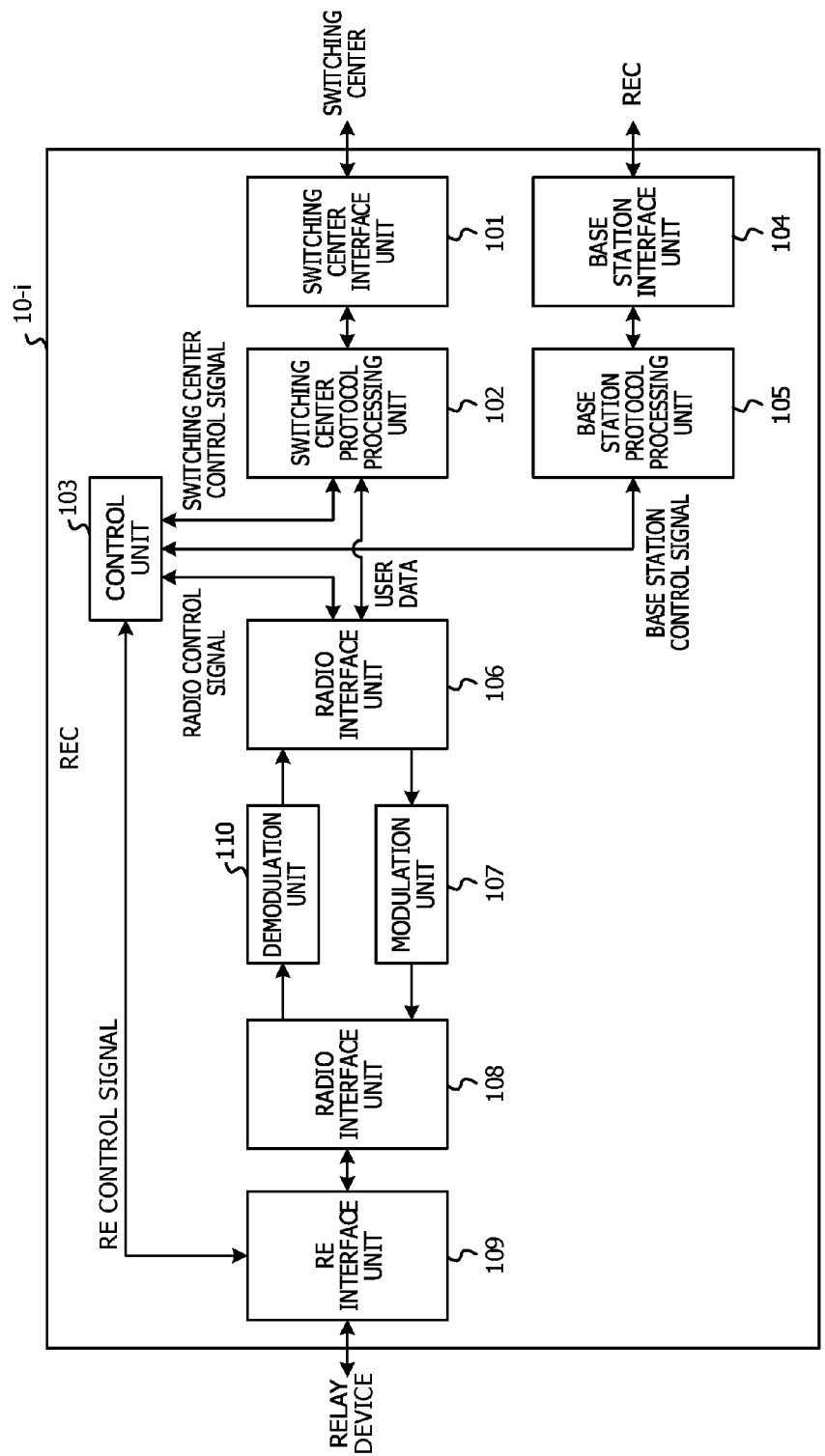
FIG. 2 illustrates one example of a configuration of an REC illustrated in FIG. 1.

As exemplified in FIG. 2, the REC 10-$i$ includes a switching center interface unit 101, a switching center protocol processing unit 102, a control unit 103, a base station interface unit 104, and a base station protocol processing unit 105. Moreover, the REC 10-$i$ illustratively includes a radio protocol processing unit 106, a modulation unit 107, a radio interface unit 108, an RE interface unit 109, and a demodulation unit 110.

The switching center interface unit 101 transmits and receives a signal between the REC 10-$i$ and the switching center 40. In the present example, the signal transmitted and received between the REC 10-$i$ and the switching center 40 includes a control signal for controlling communications and a data signal representing data transmitted and received between the switching center 40 and the UE 50. In the present example, the control signal transmitted and received between the REC 10-$i$ and the switching center 40 is expressed as a switching center control signal. In the present example, the data signal is expressed as user data.

The switching center protocol processing unit 102 acquires the switching center control signal and the user data by processing the signal received by the switching center interface unit 101 in accordance with a communication protocol prescribed in advance. The switching center protocol processing unit 102 outputs the acquired switching center control signal and user data to the control unit 103 and the radio protocol processing unit 106, respectively.

To the switching center protocol processing unit 102, a switching center control signal and user data are input from the control unit 103 and the radio protocol processing unit 106, respectively. The switching center protocol processing unit 102 processes the input switching center control signal and user data in accordance with the above-described communication protocol and transmits the signal resulting from the processing to the switching center 40 via the switching center interface unit 101.

The control unit 103 controls the operation of the REC 10-$i$ in accordance with an input control signal and outputs the control signal. For example, the control unit 103 controls a call connection in accordance with a call processing sequence prescribed in advance. Moreover, as described later, the control unit 103 controls establishment of a communication link between a port of the RE 30 and a port of the REC 10-$i$ and controls setting of a cell formed by the RE 30. In the present example, the communication link is established between a port included in the REC 10-$i$ and a port included in the RE 30.

The base station interface unit 104 transmits and receives a signal between the REC 10-$i$ and another REC 10-$p$. p denotes an integer of 1 to 3 different from i. In the present example, the signal transmitted and received between the RECs 10 includes a control signal for controlling communications. In the present example, the control signal transmitted and received between the RECs 10 is expressed as a base station control signal.

The base station protocol processing unit 105 acquires the base station control signal by processing the signal received by the base station interface unit 104 in accordance with a communication protocol prescribed in advance. The base station protocol processing unit 105 outputs the acquired base station control signal to the control unit 103.

To the base station protocol processing unit 105, a base station control signal is input from the control unit 103. The base station protocol processing unit 105 processes the input base station control signal in accordance with the above-described communication protocol and transmits the signal resulting from the processing to another REC 10-*p* via the base station interface unit 104.

In the present example, the RE interface unit 109 includes three ports each coupled to the port included in the relay device 20 via a communication cable including an optical fiber. The RE interface unit 109 may include two or less or four or more ports.

The RE interface unit 109 transmits and receives a signal between the REC 10-*i* and the relay device 20. In the present example, the signal transmitted and received between the REC 10-*i* and the relay device 20 includes a control signal for controlling communications and a DBB signal. DBB is an abbreviation of digital baseband. In the present example, the control signal transmitted and received between the REC 10-*i* and the relay device 20 is expressed as an RE control signal.

The RE interface unit 109 acquires the RE control signal and the DBB signal by processing the signal received by the relay device 20 in accordance with a standard prescribed in advance (in the present example, CPRI). The RE interface unit 109 outputs the acquired RE control signal and DBB signal to the control unit 103 and the radio interface unit 108, respectively.

To the RE interface unit 109, an RE control signal and a DBB signal are input from the control unit 103 and the radio interface unit 108, respectively. The RE interface unit 109 processes the input RE control signal and DBB signal in accordance with the above-described standard and transmits the signal resulting from the processing to the RE 30 via the relay device 20.

The signal transmitted and received between the REC 10-*i* and the relay device 20 may be expressed as a CPRI signal.

For example, the RE control signal may be included in an HDLC packet in slow C&M or an IP packet in fast C&M. C&M is an abbreviation of command and management. HDLC is an abbreviation of high-level data link control. IP is an abbreviation of internet protocol. Furthermore, the RE control signal may comply with ORI. ORI is an abbreviation of open radio equipment interface.

The radio interface unit 108 outputs the DBB signal input from the RE interface unit 109 to the demodulation unit 110.

The radio interface unit 108 outputs the DBB signal input from the modulation unit 107 to the RE interface unit 109.

The demodulation unit 110 carries out demodulation and decoding on the DBB signal input from the radio interface unit 108. Furthermore, the demodulation unit 110 measures the radio quality as the quality of radio communications between the RE 30 and the UE 50 on the basis of the DBB signal. The demodulation unit 110 outputs the signal resulting from the demodulation and decoding (in other words, uplink signal or signal from the UE 50) and the measurement result of the radio quality to the radio protocol processing unit 106.

The radio protocol processing unit 106 acquires a radio control signal and user data by processing the signal input from the demodulation unit 110 in accordance with a communication protocol prescribed in advance. The radio control signal represents a control signal for controlling radio communications between the RE 30 and the UE 50. The radio protocol processing unit 106 outputs the acquired radio control signal and user data to the control unit 103 and the switching center protocol processing unit 102, respectively.

To the radio protocol processing unit 106, a radio control signal and user data are input from the control unit 103 and the switching center protocol processing unit 102, respectively. The radio protocol processing unit 106 processes the input radio control signal and user data in accordance with the above-described communication protocol and outputs the signal resulting from the processing to the modulation unit 107.

The modulation unit 107 carries out encoding and modulation on the signal input from the radio protocol processing unit 106 (in other words, downlink signal or signal from the UE 50). The modulation unit 107 outputs a DBB signal including the signal resulting from the encoding and modulation to the radio interface unit 108.

A description will be added about the control unit 103. The control unit 103 has the following functions for each of the three ports included in the RE interface unit 109.

If a condition relating to the load of the REC 10-*i* is satisfied, the control unit 103 of the REC 10-*i* controls the RE interface unit 109 to transmit a coupling change request to the relay device 20 via the relevant port. The coupling change request is information to request change of the communication destination in an established communication link. As described later, the coupling change request is transferred from the relay device 20 coupled to the REC 10-*i* to the relay device 20 to which the RE 30 as the communication destination in the communication link is coupled. As described later, given information is added to the coupling change request by the relay device 20 coupled to the REC 10-*i*.

For example, the above-described condition is a condition that the number of pieces of UE 50 accommodated by the REC 10-*i* is equal to or larger than a given threshold. Furthermore, for example, the above-described condition is a condition that the amount of communication traffic per unit time is equal to or larger than a given threshold. Moreover, for example, the above-described condition is a condition that the processing load of the REC 10-*i* (e.g. utilization rate of a processing device or memory device) is equal to or higher than a given threshold.

When a coupling change notification is received from the relay device 20, the control unit 103 of the REC 10-*i* determines whether or not to newly establish a communication link between the REC 10-*i* and the RE 30 if the communication link has not yet been established. This determination may be expressed as establishment determination. The establishment determination will be described later.

In the present example, the coupling change notification is information to request new establishment of a communication link between the REC 10-*i* and the RE 30.

In the present example, as represented in FIG. 3, the coupling change notification includes a transmission source device identification (ID), a transmission destination device ID, a signal ID, an RE port ID, RE device information, and RE installation information.

The transmission source device ID is information to identify the relay device 20 of the transmission source. In the present example, the transmission source device ID included in the coupling change notification is information (e.g. "AID#6") to identify the relay device 20 as the transmission source of the coupling change notification (in the present example, the relay device 20-4, 20-5, or 20-6 to which the RE 30 is coupled). In the present example, AID#j is information to identify the relay device 20-j.

The transmission destination device ID is information to identify the relay device 20 of the transmission destination. In the present example, the transmission destination device ID included in the coupling change notification is given information indicating that all relay devices 20 are the transmission destinations (e.g. "AID#0").

The signal ID is information to identify the kind of signal. In the present example, the signal ID included in the coupling change notification is "SID#1" as an example indicating the coupling change notification. The RE port ID is information to identify the port to which the RE 30 is coupled in the relay device 20-4, 20-5, or 20-6 to which the RE 30 is coupled (e.g. "PID#1").

From the above, the example of the contents of the coupling change notification represented in FIG. 3 may be understood to indicate request for new establishment of a communication link between the REC 10-i and the RE 30 (e.g. RE 30-1 illustrated in FIG. 1) coupled to the port identified by the RE port ID "PID#1" in the relay device 20 identified by the transmission source device ID "AID#6" (e.g. relay device 20-6 illustrated in FIG. 1).

In the present example, the RE device information includes information representing the performance of the RE 30. In the present example, the RE device information includes the usable frequency band, the usable system bandwidth, the number of antennas, and the maximum transmission power. The usable frequency band represents the frequency band that can be used by the RE 30. The usable system bandwidth represents the system bandwidth that can be used by the RE 30. The number of antennas represents the number of antennas included in the RE 30. The maximum transmission power represents the maximum value of the transmission power of the radio signal transmitted by the RE 30.

In the present example, the RE installment information includes information representing the state of installment of the RE 30. In the present example, the RE installment information includes the installment environment, the installment position, and a sector ID. The installment environment represents the environment in which the RE 30 is installed. For example, the installment environment is an "indoor environment" or an "outdoor environment." The installment position represents the position at which the RE 30 is installed. In the present example, the installment position is information including latitude and longitude (e.g. "POS#1"). The sector ID is information to identify a sector (e.g. "SCID#1").

As described later, the RE device information and the RE installment information are held by the RE 30 in advance. In addition, if the RE 30 is coupled to the relay device 20-4, 20-5, or 20-6, the RE device information and the RE installment information are transmitted from the RE 30 to the relay device 20-4, 20-5, or 20-6 to which the RE 30 is coupled.

The coupling change notification is one example of information relating to the RE 30.

In the present example, the establishment determination includes the following processing.

The control unit 103 acquires RE device information and RE installment information from a coupling change notification.

The control unit 103 extracts cell candidates composed of cells at positions corresponding to the installment position included in the RE installment information on the basis of the acquired RE installment information and operating cell information. In the present example, the control unit 103 stores the operating cell information of each of cells located in given areas in advance. The REC 10-i may acquire the operating cell information from an external device communicably coupled.

In the present example, the operating cell information includes the position (in other words, deployment) of the cell, the size of the cell, a cell ID, the frequency band, the system bandwidth, the number of antennas, the transmission-reception system, and the transmission power. In the present example, the position of the cell is information including the latitude and longitude of the center of the cell.

The cell ID is information to identify the cell. For example, the cell ID may be represented by an integer. The transmission-reception system is the system by which the radio signal is transmitted and received in the cell. In the present example, the transmission-reception system is a system in which transmission diversity is executed or a system in which transmission diversity is not executed. In the present example, the system in which transmission diversity is executed may be expressed simply as "transmission diversity." In the present example, the system in which transmission diversity is not executed may be expressed simply as "non-transmission diversity."

In the present example, the cell candidates extracted by the control unit 103 are cells identified by the operating cell information including, as the position of the cell, a position whose distance from the installment position included in the RE installment information is equal to or smaller than a given threshold.

The control unit 103 determines whether or not the RE 30 can be used about each of the extracted cell candidates on the basis of the operating cell information of the cell candidates and the RE device information. In the present example, the control unit 103 determines that the RE 30 can be used about the cell candidate if all of the following first to fifth conditions are satisfied. In the present example, the control unit 103 determines not to use the RE 30 about the cell candidate if at least one of the following first to fifth conditions is not satisfied.

The first condition is a condition that the usable frequency band included in the RE device information includes the frequency band included in the operating cell information.

The second condition is a condition that the usable system bandwidth included in the RE device information includes the system bandwidth included in the operating cell information.

The third condition is a condition that the number of antennas included in the RE device information is equal to or larger than the number of antennas included in the operating cell information.

The fourth condition is a condition that the maximum transmission power included in the RE device information is equal to or higher than the transmission power included in the operating cell information.

The fifth condition is a condition that the number of antennas included in the RE device information is equal to or larger than two if the transmission-reception system included in the operating cell information is the system in which transmission diversity is executed.

If the cell candidate about which it is determined that the RE 30 can be used exists, the control unit 103 holds the operating cell information of this cell candidate and controls the RE interface unit 109 to transmit a coupling change response to the relay device 20 to which the REC 10-i is coupled. As described later, the relay device 20 that has received the coupling change response from the REC 10-i transmits the coupling change response to the relay device 20 as the transmission source of the coupling change notification.

In the present example, as represented in FIG. 4, the coupling change response transmitted to the relay device 20 as the transmission source of the coupling change notification includes a transmission source device ID, a transmission destination device ID, a signal ID, and an REC port ID.

In the present example, the transmission source device ID included in the coupling change response is information (e.g. "AID#3") to identify the relay device 20 as the transmission source of the coupling change response (in the present example, the relay device 20-1, 20-2, or 20-3 to which the REC 10 is coupled). In the present example, the transmission destination device ID included in the coupling change response is information (e.g. "AID#6") to identify the relay device 20 as the transmission source of the coupling change notification (in the present example, the relay device 20-4, 20-5, or 20-6 to which the RE 30 is coupled).

In the present example, the signal ID included in the coupling change response is "SID#2" as an example indicating the coupling change response. The REC port ID is information to identify the port to which the REC 10 is coupled in the relay device 20-1, 20-2, or 20-3 to which the REC 10 is coupled (e.g. "PID#3").

From the above, the example of the contents of the coupling change response represented in FIG. 4 may be understood to indicate that it is determined that the REC 10 (e.g. REC 10-3 illustrated in FIG. 1) coupled via the port identified by the REC port ID "PID#3" in the relay device 20 identified by the transmission source device ID "AID#3" (e.g. relay device 20-3 illustrated in FIG. 1) can accommodate the RE 30 coupled to the relay device 20 identified by the transmission destination device ID "AID#6" (e.g. relay device 20-6 illustrated in FIG. 1) as the relay device 20 that is the transmission source of the coupling change notification.

In this manner, the control unit 103 carries out the establishment determination.

If the condition relating to the load of the REC 10-*i* is satisfied (load of REC 10-*i* is high), the control unit 103 may control the RE interface unit 109 so as not to transmit the coupling change response. For example, the above-described condition is the condition that the number of pieces of UE 50 accommodated by the REC 10-*i* is equal to or larger than a given threshold. Furthermore, for example, the above-described condition is the condition that the amount of communication traffic per unit time is equal to or larger than a given threshold. Moreover, for example, the above-described condition is the condition that the processing load of the REC 10-*i* (e.g. utilization rate of a processing device or memory device) is equal to or higher than a given threshold. If the condition relating to the load of the REC 10-*i* is satisfied (load of REC 10-*i* is high), the control unit 103 may control the RE interface unit 109 to transmit the coupling change response indicating a negative response to the coupling change notification.

If a coupling change instruction is received from the relay device 20, the control unit 103 sets cell setting information on the basis of the held operating cell information. The coupling change instruction is information to give an instruction to establish a new communication link.

In the present example, as represented in FIG. 5, the coupling change instruction includes a link ID, a transmission source device ID, a transmission destination device ID, a signal ID, an RE port ID, and an REC port ID.

In the present example, the link ID included in the coupling change instruction is information to identify the communication link instructed to be established by this coupling change instruction (e.g. "LID#3"). In the present example, the transmission source device ID included in the coupling change instruction is information (e.g. "AID#6") to identify the relay device 20 as the transmission source of the coupling change instruction (in the present example, the relay device 20-4, 20-5, or 20-6 to which the RE 30 is coupled). In the present example, the transmission destination device ID included in the coupling change instruction is information (e.g. "AID#3") to identify the relay device 20 as the transmission source of the coupling change response (in the present example, the relay device 20-1, 20-2, or 20-3 to which the REC 10 is coupled).

In the present example, the signal ID included in the coupling change instruction is "SID#3" as an example indicating the coupling change instruction. The RE port ID is information to identify the port to which the RE 30 is coupled in the relay device 20-4, 20-5, or 20-6 to which the RE 30 is coupled (e.g. "PID#1"). The REC port ID is information to identify the port to which the REC 10 is coupled in the relay device 20-1, 20-2, or 20-3 to which the REC 10 is coupled (e.g. "PID#3").

From the above, the example of the contents of the coupling change instruction represented in FIG. 5 may be understood to give an instruction to establish a new communication link between the RE 30 (e.g. RE 30-1 illustrated in FIG. 1) coupled via the port identified by the RE port ID "PID#1" in the relay device 20 identified by the transmission source device ID "AID#6" (e.g. relay device 20-6 illustrated in FIG. 1) and the REC 10 (e.g. REC 10-3 illustrated in FIG. 1) coupled via the port identified by the REC port ID "PID#3" in the relay device 20 identified by the transmission destination device ID "AID#3" (e.g. relay device 20-3 illustrated in FIG. 1).

In the present example, the coupling change instruction is received by the REC 10-*i* and the setting of the cell setting information is carried out and thereby the establishment of the communication link between the ports identified by the coupling change instruction is completed.

In the present example, as represented in FIG. 6, the cell setting information includes the system bandwidth and the transmission-reception system. In the present example, the setting of the cell setting information includes storing the cell setting information decided on the basis of the above-described operating cell information and the REC port ID included in the coupling change instruction received from the relay device 20 while associating the cell setting information and the REC port ID with each other. The cell setting information is one example of information relating to a radio link. In the present example, the radio link is a communication link by radio between the RE 30 and the UE 50.

The control unit 103 controls the RE interface unit 109 to transmit a cell setting notification including the set cell setting information to the RE 30 as the communication destination in the newly-established communication link.

The REC 10-*i* transmits and receives user data between the REC 10-*i* and the RE 30 via the established communication link in accordance with the set cell setting information.

If a coupling release instruction is received from the relay device 20, the control unit 103 releases the setting of the cell setting information. The coupling release instruction is information to give an instruction to release an already-established communication link. In the present example, the release of the setting of the cell setting information includes deletion of the stored cell setting information.

In the present example, each of the coupling change request, the coupling change notification, the coupling change response, the coupling change instruction, the coupling release instruction, and the cell setting notification is the RE control signal.

Functions of the switching center interface unit 101, the base station interface unit 104, and the RE interface unit 109 may be implemented by a programmable logic circuit device (e.g. PLD or FPGA). PLD is an abbreviation of programmable logic device. FPGA is an abbreviation of field-programmable gate array.

Functions of the radio interface unit 108, the modulation unit 107, the demodulation unit 110, and the radio protocol processing unit 106 may be implemented by a dedicated processor such as a digital signal processor (DSP). Functions of the switching center interface unit 101, the base station protocol processing unit 105, and the control unit 103 may be implemented by a general-purpose processor such as a central processing unit (CPU).

(Configuration; RE)

Next, the configuration of the RE 30-$k$ will be described.

Figure 7:
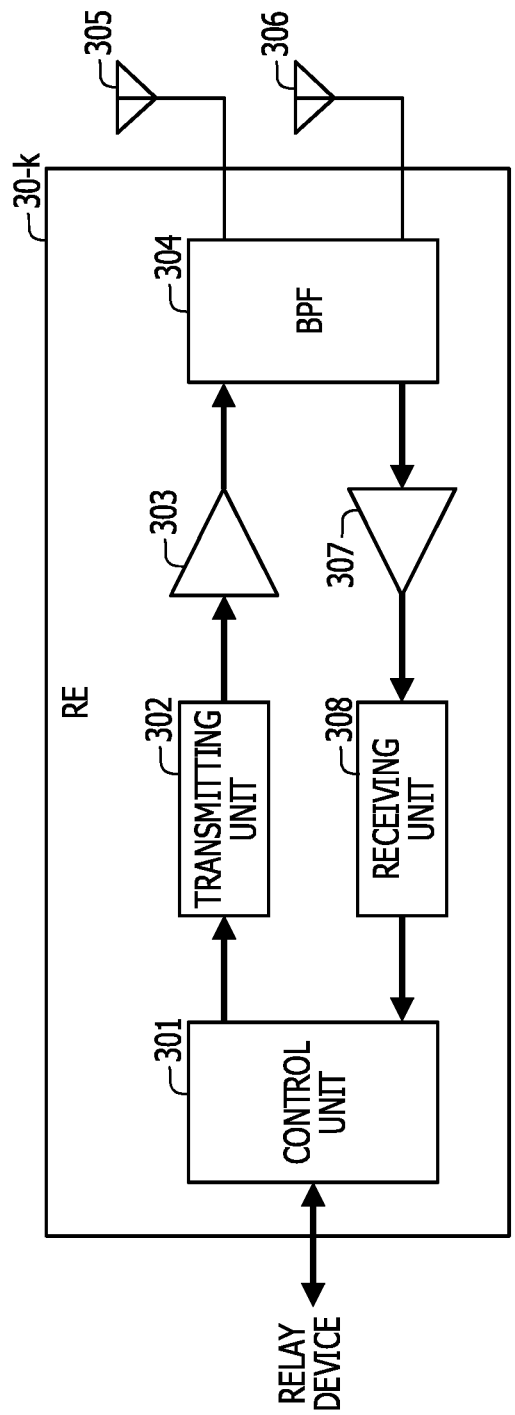
FIG. 7 illustrates one example of a configuration of an RE illustrated in FIG. 1.

As exemplified in FIG. 7, the RE 30-$k$ includes a control unit 301, a transmitting unit 302, amplifiers 303 and 307, a BPF 304, a transmitting antenna 305, a receiving antenna 306, and a receiving unit 308. BPF is an abbreviation of band pass filter.

In the present example, the control unit 301 includes a port coupled to a port included in the relay device 20 via a communication cable including an optical fiber. The control unit 301 transmits and receives a signal between the RE 30-$k$ and the relay device 20. In the present example, the signal transmitted and received between the RE 30-$k$ and the relay device 20 includes an RE control signal for controlling communications and a DBB signal.

The control unit 301 acquires the RE control signal and the DBB signal by processing the signal received from the relay device 20 in accordance with the above-described standard (in the present example, CPRI). The control unit 301 outputs the acquired DBB signal to the transmitting unit 302. The control unit 301 controls the operation of the RE 30-$k$ on the basis of the acquired RE control signal. In the present example, the control unit 301 holds cell setting information if the RE control signal includes the cell setting information.

To the control unit 301, a DBB signal is input from the receiving unit 308. The control unit 301 processes the input DBB signal in accordance with the above-described standard and transmits the signal resulting from the processing to the REC 10 via the relay device 20.

The signal transmitted and received between the RE 30-$k$ and the relay device 20 may be expressed as a CPRI signal.

Furthermore, the control unit 301 stores RE device information and RE installment information in advance. The RE device information may be set at the time of manufacturing or shipment of the RE 30-$k$. The RE installment information may be set at the time of installment of the RE 30-$k$. If the RE 30-$k$ is newly coupled to the relay device 20, the control unit 301 transmits the stored RE device information and RE installment information to the relay device 20.

On the basis of the cell setting information held by the control unit 301, the transmitting unit 302 converts the DBB signal input from the control unit 301 to a radio frequency (RF) signal and outputs the converted signal to the amplifier 303.

The amplifier 303 amplifies the signal input from the transmitting unit 302 and outputs the amplified signal to the BPF 304.

The BPF 304 executes filter processing of extracting a signal of a given frequency band from the signal input from the amplifier 303 and outputs the signal resulting from the processing to the transmitting antenna 305.

The transmitting antenna 305 transmits the signal input from the BPF 304 to the UE 50 by radio. The transmitting antenna 305 includes plural antennas.

The receiving antenna 306 may include plural antennas. Furthermore, the receiving antenna 306 may be used in common with the transmitting antenna 305.

The receiving antenna 306 receives a signal by radio and outputs the received signal to the BPF 304.

The BPF 304 executes filter processing of extracting a signal of a given frequency band from the signal input from the receiving antenna 306 and outputs the signal resulting from the processing to the amplifier 307.

The amplifier 307 amplifies the signal input from the BPF 304 and outputs the amplified signal to the receiving unit 308.

On the basis of the cell setting information held by the control unit 301, the receiving unit 308 converts an RF signal that is the signal input from the amplifier 307 to a DBB signal and outputs the converted signal to the control unit 301.

(Configuration; Relay Device)

Next, the configuration of the relay device 20-$j$ will be described.

Figure 8:
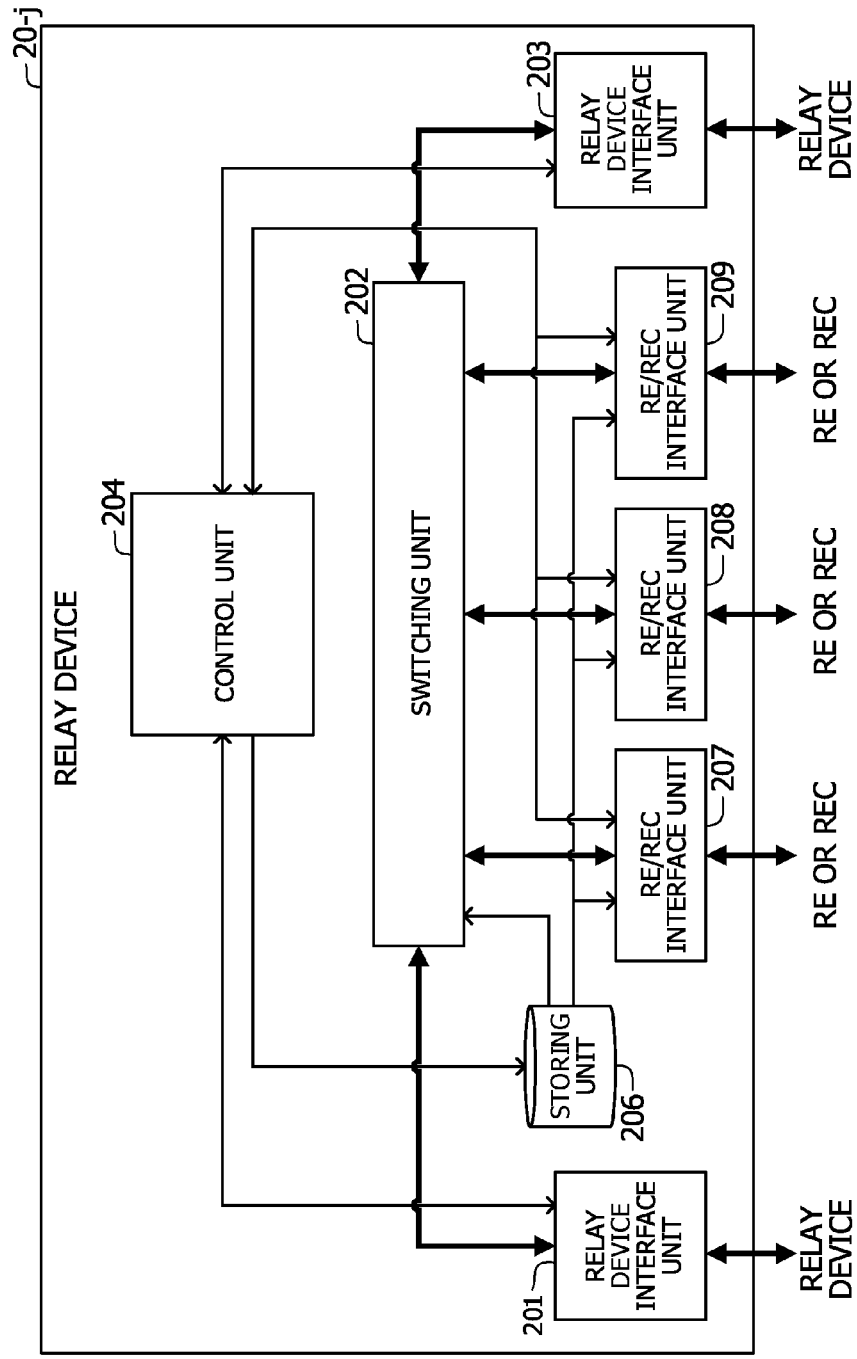
FIG. 8 illustrates one example of a configuration of the relay device illustrated in FIG. 1.

As exemplified in FIG. 8, the relay device 20-$j$ includes relay device interface units 201 and 203, a switching unit 202, a control unit 204, a storing unit 206, and RE/REC interface units 207 to 209.

In the present example, the relay device interface units 201 and 203 each include a port coupled to a port included in a respective one of two other relay devices 20-$m$ and 20-$n$ adjacent to the relay device 20-$j$ via a communication cable including an optical fiber. The relay device interface units 201 and 203 transmit and receive a signal between the relay device 20-$j$ and other relay devices 20-$m$ and 20-$n$ coupled to the relay device 20-$j$.

The relay device interface units 201 and 203 each acquire an RE control signal by processing the received signal in accordance with the above-described standard (in the present example, CPRI), and outputs the acquired RE control signal to the control unit 204. This processing of the RE control signal may be expressed as demultiplexing of the RE control signal.

The relay device interface units 201 and 203 process an RE control signal input from the control unit 204 in accordance with the above-described standard, and transmit the signal resulting from the processing to other relay devices 20-$m$ and 20-$n$ as the coupled objects. This processing of the RE control signal may be expressed as multiplexing of the RE control signal.

The relay device interface units 201 and 203 each output a received signal to the switching unit 202 and transmit a signal input from the switching unit 202 to other relay devices 20-$m$ and 20-$n$, respectively, as the coupled objects.

To the control unit 204, an RE control signal is input from each of the relay device interface units 201 and 203 and the RE/REC interface units 207 to 209.

The control unit 204 controls the operation of the relay device 20-$j$ on the basis of the input RE control signal. The control based on the RE control signal will be described later.

If the transmission destination of the input RE control signal is the relay device 20-*j*, the control unit 204 may control the relay device interface units 201 and 203 and the RE/REC interface units 207 to 209 so that the RE control signal may be kept from being transmitted to the external of the relay device 20-*j*. That the relay device 20 identified by the transmission destination device ID included in the input RE control signal is the relay device 20-*j* is one example of that the transmission destination of the input RE control signal is the relay device 20-*j*.

In the present example, each of the RE/REC interface units 207 to 209 includes a port coupled to a port included in the RE 30 or the REC 10 via a communication cable including an optical fiber. Each of the RE/REC interface units 207 to 209 detects that the RE 30 or the REC 10 is newly coupled. Each of the RE/REC interface units 207 to 209 transmits and receives a signal to and/or a signal from the RE 30 or the REC 10 coupled to the relay device 20-*j*.

In the present example, to the relay device 20-*j*, information representing whether the device coupled to a respective one of the RE/REC interface units 207 to 209 is the RE 30 or the REC 10 is input. For example, the relay device 20-*j* may include a switch associated with each of the RE/REC interface units 207 to 209 and the above-described information may be input through operation of the switch. Furthermore, for example, the relay device 20-*j* may hold a setting file and the above-described information may be input through update of the held setting file.

Furthermore, each of the RE/REC interface units 207 to 209 may each include a port to which the RE 30 is coupled and another port to which the REC 10 is coupled.

Each of the RE/REC interface units 207 to 209 acquires an RE control signal by processing a received signal in accordance with the above-described standard (in the present example, CPRI), and outputs the acquired RE control signal to the control unit 204. This processing of the RE control signal may be expressed as demultiplexing of the RE control signal.

Each of the RE/REC interface units 207 to 209 processes an RE control signal input from the control unit 204 in accordance with the above-described standard and transmits the signal resulting from the processing to the RE 30 or the REC 10 as the coupled object. This processing of the RE control signal may be expressed as multiplexing of the RE control signal.

Each of the RE/REC interface units 207 to 209 executes reduction processing on a received signal and outputs the signal resulting from the processing to the switching unit 202. Each of the RE/REC interface units 207 to 209 executes compensation processing on a signal input from the switching unit 202 and transmits the signal resulting from the processing to the RE 30 or the REC 10 as the coupled object.

The reduction processing and the compensation processing will be described later.

The storing unit 206 stores coupling information in which a link ID, an RE device ID, an RE port ID, an REC device ID, and an REC port ID are associated.

The RE device ID is information to identify the relay device 20 to which the RE 30 forming a communication link is coupled. The RE port ID is information to identify the port to which the RE 30 forming the communication link is coupled in the relay device 20 to which the RE 30 is coupled.

The REC device ID is information to identify the relay device 20 to which the REC 10 forming the communication link is coupled. The REC port ID is information to identify the port to which the REC 10 forming the communication link is coupled in the relay device 20 to which the REC 10 is coupled.

If a coupling change instruction is input, the control unit 204 updates the coupling information stored by the storing unit 206 on the basis of information included in the coupling change instruction.

In the present example, the update of the coupling information is carried out as follows.

If the coupling information including the RE device ID and the RE port ID corresponding with the transmission source device ID and the RE port ID, respectively, in the coupling change instruction is stored in the storing unit 206, the control unit 204 deletes this coupling information from the storing unit 206. Moreover, the control unit 204 causes the storing unit 206 to newly store the coupling information including the link ID, the transmission source device ID, the transmission destination device ID, the RE port ID, and the REC port ID included in the coupling change instruction as the link ID, the RE device ID, the REC device ID, the RE port ID, and the REC port ID, respectively.

By the above, the update of the coupling information is carried out.

The storing unit 206 stores cell information in which a link ID and cell setting information are associated.

If a cell setting notification is input, the control unit 204 updates the cell information stored by the storing unit 206 on the basis of information included in the cell setting notification.

In the present example, the update of the cell information is carried out as follows.

The control unit 204 acquires the link ID included in the coupling information including the REC device ID, the RE device ID, the RE port ID, and the REC port ID corresponding with the transmission source device ID, the transmission destination device ID, the RE port ID, and the REC port ID, respectively, included in the cell setting notification.

The control unit 204 replaces the cell setting information associated with the acquired link ID in the cell information by the cell setting information included in the cell setting notification.

By the above, the update of the cell information is carried out.

The switching unit 202 acquires a link ID on the basis of an input signal and switches the output destination of the input signal on the basis of the coupling information stored in the storing unit 206 and the acquired link ID.

In the present example, if the relay device 20-*j* receives a signal via a port to which the RE 30 is coupled in an established communication link, the switching unit 202 of the relay device 20-*j* acquires the link ID associated with the RE port ID to identify this port and the RE device ID to identify this relay device 20-*j* in the coupling information. The switching unit 202 adds the acquired link ID to the received signal. The switching unit 202 outputs the signal to which the link ID is added to the relay device interface unit 201 or 203.

If the relay device 20-*j* receives a signal via a port to which the REC 10 is coupled in an established communication link, the switching unit 202 of the relay device 20-*j* acquires the link ID associated with the REC port ID to identify this port and the REC device ID to identify this relay device 20-*j* in the coupling information. The switching unit 202 adds the acquired link ID to the received signal. The switching unit 202 outputs the signal to which the link ID is added to the relay device interface unit 201 or 203.

If the relay device 20-*j* receives a signal from another relay device 20-*m* or 20-*n* in an established communication link, the switching unit 202 of the relay device 20-*j* acquires the RE device ID, the RE port ID, the REC device ID, and the REC port ID that are associated with the link ID added to this signal in the coupling information. If the relay device 20 identified by the acquired RE device ID or REC device ID is the relay device 20-*j*, the switching unit 202 of the relay device 20-*j* outputs the received signal to the port identified by the acquired RE port ID or REC port ID. On the other hand, if the relay device 20 identified by the acquired RE device ID or REC device ID is not the relay device 20-*j*, the switching unit 202 of the relay device 20-*j* outputs this signal to the relay device interface unit 201 or 203 to which another relay device 20-*m* or 20-*n* different from the transmission source of the received signal is coupled.

In the present example, if the relay device 20-*j* receives a signal from the RE 30 or the REC 10, the link ID is added to the received signal by the relay device 20-*j*. The relay device 20-*j* may transmit the signal received from the RE 30 or the REC 10 at timing associated with the link ID. In this case, the link ID may be acquired on the basis of the timing at which the signal is received, without being added to the signal.

A description will be added about the control unit 204.

If a coupling change request is received via a port to which the REC 10 is coupled, the control unit 204 adds given information to the received coupling change request. In the present example, as represented in FIG. 9, the information added to the coupling change request includes a transmission source device ID, a transmission destination device ID, a signal ID, an RE port ID, and an REC port ID. The control unit 204 controls the relay device interface unit 201 or 203 to transmit the coupling change request resulting from the addition of the information to another relay device 20-*m* or 20-*n*.

At least part of the information included in the coupling change request transmitted by the relay device 20 may be made to be included in the coupling change request by the REC 10-*i* as the transmission source of the coupling change request instead of the relay device 20.

In the present example, the transmission source device ID included in the coupling change request is information (e.g. "AID#2") to identify the relay device 20 that receives the coupling change request from the REC 10 (in the present example, the relay device 20-1, 20-2, or 20-3 to which the REC 10 is coupled). In the present example, the REC port ID included in the coupling change request is information to identify the port used for the reception of the coupling change request from the REC 10. In the present example, the signal ID included in the coupling change request is "SID#4."

In the present example, the transmission destination device ID included in the coupling change request is information to identify the relay device 20 to which the RE 30 forming a communication link with the port of the REC 10 identified by the transmission source device ID and the REC port ID is coupled (e.g. "AID#6"). In the present example, the RE port ID included in the coupling change request is information to identify the port to which the above-described RE 30 is coupled in the relay device 20-4, 20-5, or 20-6 to which the above-described RE 30 is coupled (e.g. "PID#1").

If the coupling change request is received by the relay device interface unit 201 or 203 and the relay device 20 identified by the transmission destination device ID included in the coupling change request is the relay device 20-*j*, the control unit 204 of the relay device 20-*j* controls the relay device interface unit 201 or 203. In the present example, in this case, the control unit 204 creates a coupling change notification and controls the relay device interface unit 201 or 203 to transmit the created coupling change notification to another relay device 20-*m* or 20-*n*. Moreover, in this case, the control unit 204 controls the relay device interface unit 201 or 203 to transmit a coupling release instruction to another relay device 20-*m* or 20-*n*.

In the present example, the coupling release instruction includes a transmission source device ID, a transmission destination device ID, a signal ID, an RE port ID, and an REC port ID similarly to the coupling change request. In the present example, the transmission source device ID included in the coupling release instruction is the transmission destination device ID included in the coupling change request that is the basis of the transmission of the coupling release instruction. In the present example, the transmission destination device ID included in the coupling release instruction is the transmission source device ID included in the coupling change request that is the basis of the transmission of the coupling release instruction. In the present example, the signal ID included in the coupling release instruction is "SID#5." In the present example, the RE port ID and the REC port ID included in the coupling release instruction are the same as the RE port ID and the REC port ID, respectively, included in the coupling change request that is the basis of the transmission of the coupling release instruction.

If the coupling release instruction is input, the control unit 204 updates coupling information stored by the storing unit 206 on the basis of information included in the coupling release instruction.

In the present example, the update of the coupling information is carried out as follows.

If the coupling information including the RE device ID and the RE port ID corresponding with the transmission source device ID and the RE port ID, respectively, included in the coupling release instruction is stored in the storing unit 206, the control unit 204 deletes this coupling information from the storing unit 206.

By the above, the update of the coupling information is carried out.

If the coupling release instruction is received and the relay device 20 identified by the transmission destination device ID included in the coupling release instruction is the relay device 20-*j*, the control unit 204 of the relay device 20-*j* controls the RE/REC interface units 207 to 209 on the basis of the coupling release instruction. In the present example, the control unit 204 controls the RE/REC interface unit 207, 208, or 209 to transmit the coupling release instruction to the REC 10 via the port identified by the REC port ID included in the coupling release instruction.

If coupling of the RE 30 is detected by the RE/REC interface unit 207, 208, or 209, the control unit 204 creates a coupling change notification and controls the relay device interface unit 201 or 203 to transmit the created coupling change notification to another relay device 20-*m* or 20-*n*.

If the coupling change notification is received and the REC 10 is coupled to the relay device 20-*j*, the control unit 204 of the relay device 20-*j* controls the RE/REC interface units 207 to 209 to transmit the coupling change notification to the REC 10 via the respective ports to which the REC 10 is coupled.

If a coupling change response is received via the port to which the REC 10 is coupled, the control unit 204 controls the relay device interface unit 201 or 203 to transmit the coupling change response to another relay device 20-*m* or 20-*n*.

If the coupling change response is received and the relay device 20 identified by the transmission destination device ID included in the coupling change response is the relay device 20-*j*, the control unit 204 of the relay device 20-*j* controls the relay device interface unit 201 or 203. In the present example, in this case, the control unit 204 controls the relay device interface unit 201 or 203 to transmit a coupling change instruction to another relay device 20-*m* or 20-*n*.

In the present example, if plural different coupling change responses are received, the control unit 204 selects one coupling change response in accordance with a given system. The selection of the coupling change response may be understood to be selection of the REC 10 of the transmission source of the coupling change response. In other words, the selection of the coupling change response is one example of selection of the REC 10. For example, the coupling change response may be randomly selected on the basis of a pseudorandom number. Furthermore, the coupling change response may be selected in accordance with a round-robin system.

If the coupling change instruction is received and the relay device 20 identified by the transmission destination device ID included in the coupling change instruction is the relay device 20-*j*, the control unit 204 of the relay device 20-*j* controls the RE/REC interface unit 207, 208, or 209. In the present example, in this case, the control unit 204 controls the RE/REC interface unit 207, 208, or 209 to transmit the coupling change instruction to the REC 10 via the port identified by the REC port ID included in the coupling change instruction.

If a cell setting notification is received via the port to which the REC 10 is coupled, the control unit 204 controls the relay device interface unit 201 or 203 to transmit the cell setting notification to another relay device 20-*m* or 20-*n*.

In the present example, the cell setting notification transmitted by the relay device 20 includes a transmission source device ID, a transmission destination device ID, a signal ID, an RE port ID, an REC port ID, and cell setting information.

In the present example, the transmission source device ID included in the cell setting notification is information (e.g. "AID#3") to identify the relay device 20 that receives the cell setting notification from the REC 10 (in the present example, the relay device 20-1, 20-2, or 20-3 to which the REC 10 is coupled). In the present example, the REC port ID included in the cell setting notification is information to identify the port used for the reception of the cell setting notification from the REC 10. In the present example, the signal ID included in the cell setting notification is "SID#6."

In the present example, the transmission destination device ID included in the cell setting notification is information to identify the relay device 20 to which the RE 30 to form a communication link with the port of the REC 10 identified by the transmission source device ID and the REC port ID is coupled (e.g. "AID#6"). In the present example, the RE port ID included in the cell setting notification is information to identify the port to which the above-described RE 30 is coupled in the relay device 20-4, 20-5, or 20-6 to which the above-described RE 30 is coupled (e.g. "PID#1").

If the cell setting notification is received and the relay device 20 identified by the transmission destination device ID included in the cell setting notification is the relay device 20-*j*, the control unit 204 of the relay device 20-*j* controls the RE/REC interface unit 207, 208, or 209. In the present example, in this case, the control unit 204 controls the RE/REC interface unit 207, 208, or 209 to transmit the cell setting information to the RE 30 via the port identified by the RE port ID included in the cell setting notification.

Next, a description will be added about the reduction processing and the compensation processing.

Each of the RE/REC interface units 207 to 209 executes the reduction processing and the compensation processing on the basis of cell setting information included in cell information stored by the storing unit 206. In the present example, the reduction processing and the compensation processing are executed on the basis of the cell setting information stored in association with the port included in each of the RE/REC interface units 207 to 209.

The reduction processing is processing of selecting a partial DBB signal from a DBB signal included in a CPRI signal from the RE 30 or the REC 10 as the coupled object to output the selected partial DBB signal to the switching unit 202 and omit output of the residual part. The DBB signal is one example of user data. In the present example, the selection of the DBB signal to be output to the switching unit 202 is carried out on the basis of the cell setting information.

Due to this, a signal that includes the selected partial DBB signal and does not include the DBB signal of the residual part that is not selected is transmitted between the relay devices 20. As a result, the amount of data transmitted between the relay devices 20 decreases. Control of the amount of data transmitted between the relay devices 20 is one example of control of the transmission rate between the relay devices 20.

The compensation processing is processing of adding an additional DBB signal to a DBB signal included in a signal to the RE 30 or the REC 10 as the coupled object, input from the switching unit 202, and transmitting the DBB signal resulting from the addition to the RE 30 or the REC 10 as the coupled object. In the present example, the additional DBB signal is the DBB signal lost by the above-described reduction processing. Therefore, the DBB signal resulting from the addition corresponds with the DBB signal before the execution of the above-described reduction processing. The addition of the DBB signal may be expressed as compensation of the DBB signal or restoration of the DBB signal. In the present example, the decision of the additional DBB signal is carried out on the basis of the cell setting information.

A case will be assumed in which the maximum value of the transmission rate between the relay device 20 and the RE 30 or the REC 10 in one communication link is 2.4 Gbps. Moreover, a case will be assumed in which the system bandwidth is 5 MHz and the transmission-reception system is transmission diversity in cell setting information set about the RE 30 forming a certain communication link.

Figure 10A:
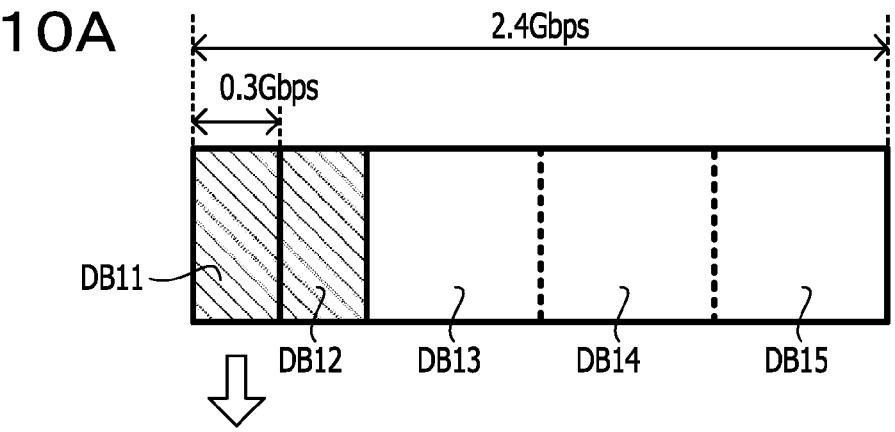
FIGS. 10A to 10C, 11A to 11C, 12A to 12C, and 13A to 13C illustrate one example of reduction processing and compensation processing executed by the relay device illustrated in FIG. 1.

In this case, as exemplified in FIG. 10A, in the above-described communication link, only parts DB11 and DB12 as the leading 25% of a DBB signal received by the relay device 20 from the RE 30 or the REC 10 are valid data. In the present example, the valid data is created on the basis of user data transmitted and received between the RE 30 and the UE 50. In the above-described communication link, the other parts (in other words, residual parts) DB13 to DB15 of the DBB signal received by the relay device 20 from the RE 30 or the REC 10 are given dummy data. For example, the dummy data is a collection of bits representing "0."

As above, the above-described DBB signal includes the valid data with an amount corresponding to a value (in the present example, 0.6 Gbps) obtained by multiplying the maximum value of the transmission rate by the ratio of the system bandwidth used in the cell (in the present example, 5 MHz) to the upper limit of the system bandwidth (in the present example, 20 MHz).

Moreover, if the transmission-reception system is transmission diversity, the former half DB11 of the valid data corresponds with the latter half DB12 of the valid data. For example, the former half DB11 of the valid data is data for a first antenna and the latter half DB12 of the valid data is data for a second antenna.

Figure 10B:
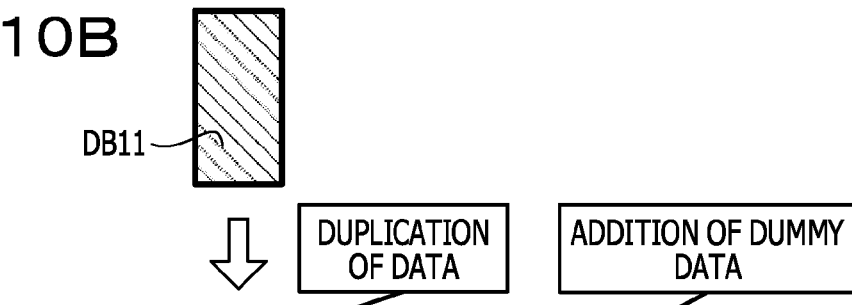

Hence, as exemplified in FIG. 10B, if the DBB signal is received from the RE 30 or the REC 10 as the coupled object, the relay device 20-$j$ selects the part DB11 as the leading 12.5% of the DBB signal in the reduction processing. Then, the relay device 20-$j$ transmits only the selected part DB11 to another relay device 20-$m$ or 20-$n$.

Figure 10C:
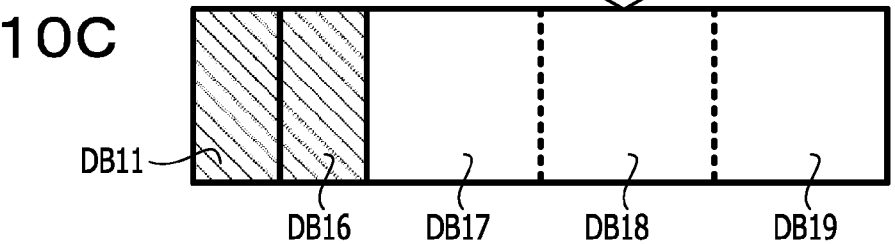

Moreover, as exemplified in FIG. 10C, in the case of transmitting a DBB signal to the RE 30 or the REC 10 as the coupled object, the relay device 20-$j$ decides an additional DBB signal DB16 to DB19 in the compensation processing. Furthermore, the relay device 20-$j$ adds the decided additional DBB signal DB16 to DB19 to the DBB signal DB11 received from another relay device 20-$m$ or 20-$n$ in the compensation processing. Then, the relay device 20-$j$ transmits the DBB signal DB11 and DB16 to DB19 resulting from the addition to the RE 30 or the REC 10 as the coupled object in the compensation processing.

In the present example, the additional DBB signal DB16 is the same as the DBB signal DB11 received from another relay device 20-$m$ or 20-$n$. In the present example, the additional DBB signal DB16 is created by duplicating the DBB signal DB11. In the present example, the additional DBB signal DB17 to DB19 is the same as the dummy data DB13 to DB15 in FIG. 10A. The addition of the additional DBB signal DB17 to DB19 may be expressed as the addition of the dummy data.

Next, a case will be assumed in which the system bandwidth is 5 MHz and the transmission-reception system is non-transmission diversity in cell setting information set about the RE 30 forming a certain communication link.

Figure 11A:
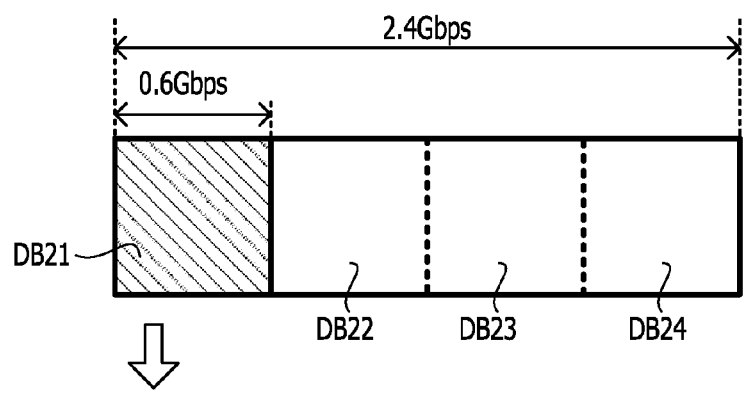

In this case, as exemplified in FIG. 11A, in the above-described communication link, only a part DB21 as the leading 25% of a DBB signal received by the relay device 20 from the RE 30 or the REC 10 is valid data. In the above-described communication link, the other parts (in other words, residual parts) DB22 to DB24 of the DBB signal received by the relay device 20 from the RE 30 or the REC 10 are given dummy data.

Figure 11B:
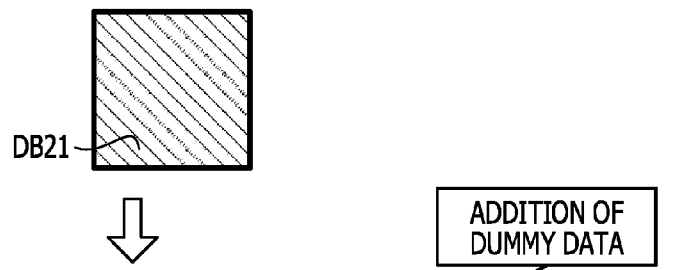

Hence, as exemplified in FIG. 11B, if the DBB signal is received from the RE 30 or the REC 10 as the coupled object, the relay device 20-$j$ selects the part DB21 as the leading 25% of the DBB signal in the reduction processing. Then, the relay device 20-$j$ transmits only the selected part DB21 to another relay device 20-$m$ or 20-$n$.

Figure 11C:
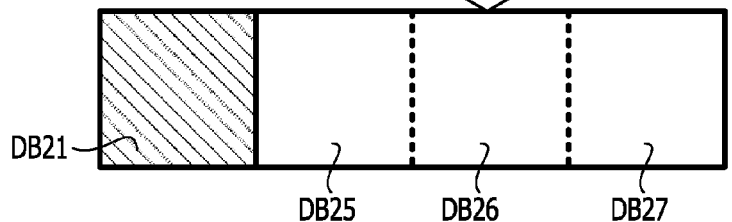

Moreover, as exemplified in FIG. 11C, in the case of transmitting a DBB signal to the RE 30 or the REC 10 as the coupled object, the relay device 20-$j$ decides an additional DBB signal DB25 to DB27 in the compensation processing. Furthermore, the relay device 20-$j$ adds the decided additional DBB signal DB25 to DB27 to the DBB signal DB21 received from another relay device 20-$m$ or 20-$n$ in the compensation processing. Then, the relay device 20-$j$ transmits the DBB signal DB21 and DB25 to DB27 resulting from the addition to the RE 30 or the REC 10 as the coupled object in the compensation processing. In the present example, the additional DBB signal DB25 to DB27 is the same as the dummy data DB22 to DB24 in FIG. 11A.

Next, a case will be assumed in which the system bandwidth is 20 MHz and the transmission-reception system is transmission diversity in cell setting information set about the RE 30 forming a certain communication link.

Figure 12A:
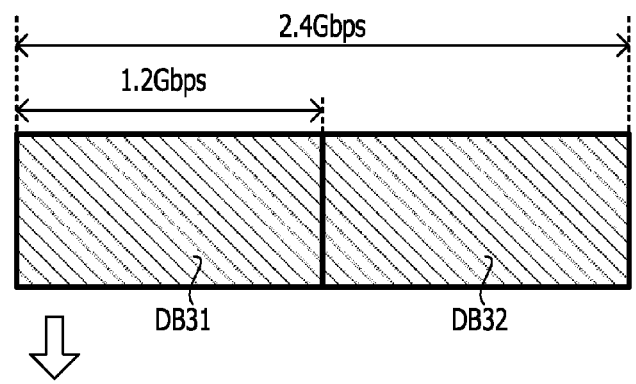

In this case, as exemplified in FIG. 12A, in the above-described communication link, parts DB31 and DB32 as the whole of a DBB signal received by the relay device 20 from the RE 30 or the REC 10 are valid data.

Moreover, if the transmission-reception system is transmission diversity, the former half DB31 of the valid data corresponds with the latter half DB32 of the valid data. For example, the former half DB31 of the valid data is data for the first antenna and the latter half DB32 of the valid data is data for the second antenna.

Figure 12B:
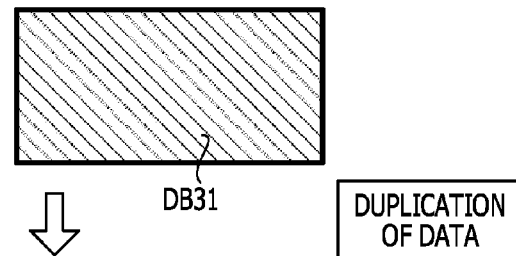

Hence, as exemplified in FIG. 12B, if the DBB signal is received from the RE 30 or the REC 10 as the coupled object, the relay device 20-$j$ selects the part DB31 as the leading 50% of the DBB signal in the reduction processing. Then, the relay device 20-$j$ transmits only the selected part DB31 to another relay device 20-$m$ or 20-$n$.

Figure 12C:
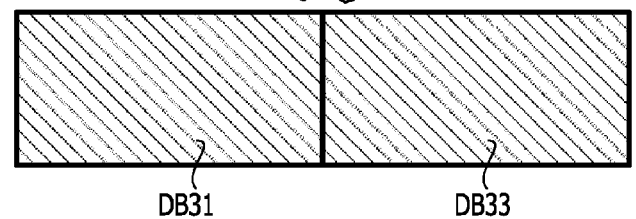

Moreover, as exemplified in FIG. 12C, in the case of transmitting a DBB signal to the RE 30 or the REC 10 as the coupled object, the relay device 20-$j$ decides an additional DBB signal DB33 in the compensation processing. Furthermore, the relay device 20-$j$ adds the decided additional DBB signal DB33 to the DBB signal DB31 received from another relay device 20-$m$ or 20-$n$ in the compensation processing. Then, the relay device 20-$j$ transmits the DBB signal DB31 and DB33 resulting from the addition to the RE 30 or the REC 10 as the coupled object in the compensation processing.

In the present example, the additional DBB signal DB33 is the same as the DBB signal DB31 received from another relay device 20-$m$ or 20-$n$. In the present example, the additional DBB signal DB33 is created by duplicating the DBB signal DB31.

Next, a case will be assumed in which the system bandwidth is 20 MHz and the transmission-reception system is non-transmission diversity in cell setting information set about the RE 30 forming a certain communication link.

Figure 13A:
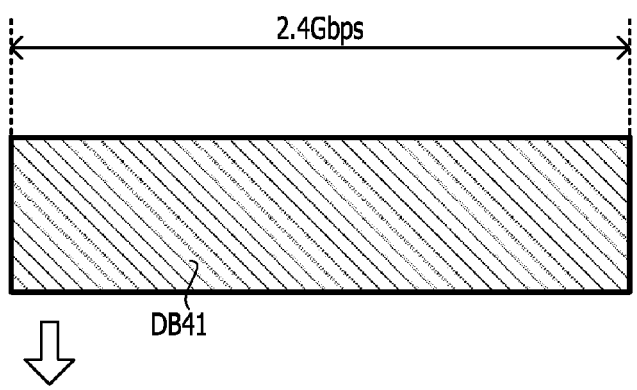

In this case, as exemplified in FIG. 13A, in the above-described communication link, a part DB41 as the whole of a DBB signal received by the relay device 20 from the RE 30 or the REC 10 is valid data.

Figure 13B:
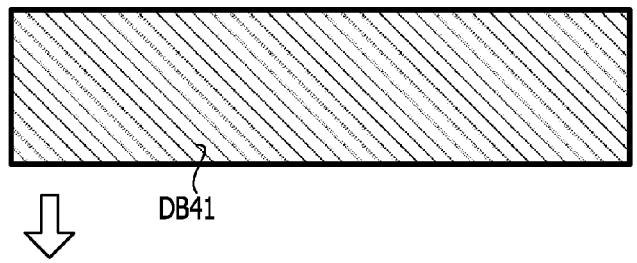

Hence, as exemplified in FIG. 13B, if the DBB signal is received from the RE 30 or the REC 10 as the coupled object, the relay device 20-$j$ selects the whole part DB41 of the DBB signal in the reduction processing. Then, the relay device 20-$j$ transmits the selected whole part DB41 of the DBB signal to another relay device 20-$m$ or 20-$n$.

Figure 13C:
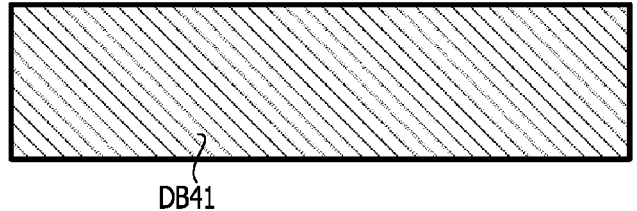

Moreover, as exemplified in FIG. 13C, in the case of transmitting a DBB signal to the RE 30 or the REC 10 as the coupled object, the relay device 20-$j$ does not add an additional DBB signal in the compensation processing. Therefore, the relay device 20-$j$ transmits the DBB signal DB41 received from another relay device 20-$m$ or 20-$n$ to the RE 30 or the REC 10 as the coupled object in the compensation processing.

The reduction processing and the compensation processing may be executed not on the basis of the transmission-reception system but on the basis of the system bandwidth. A description will be made about the reduction processing and the compensation processing in this modification example.

A case will be assumed in which the system bandwidth is 5 MHz and the transmission-reception system is transmission diversity in cell setting information set about the RE 30 forming a certain communication link.

Figure 14A:
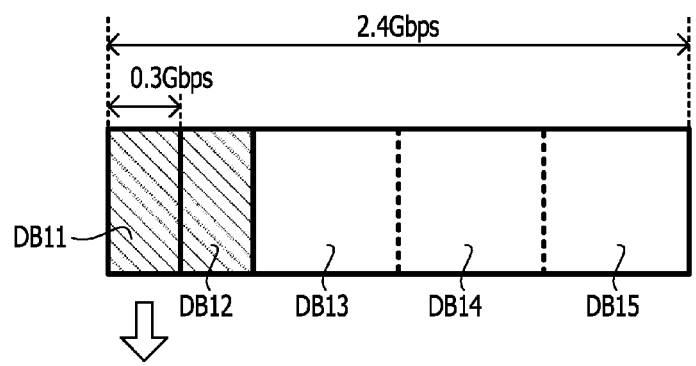
FIGS. 14A to 14C illustrate one example of reduction processing and compensation processing executed by a relay device according to a modification example.

In this case, as exemplified in FIG. 14A, in the above-described communication link, only the parts DB11 and DB12 as the leading 25% of a DBB signal received by the relay device 20 from the RE 30 or the REC 10 are valid data. In the above-described communication link, the other parts (in other words, residual parts) DB13 to DB15 of the DBB signal received by the relay device 20 from the RE 30 or the REC 10 are given dummy data. Moreover, because the transmission-reception system is transmission diversity, the former half DB11 of the valid data corresponds with the latter half DB12 of the valid data.

Figure 14B:
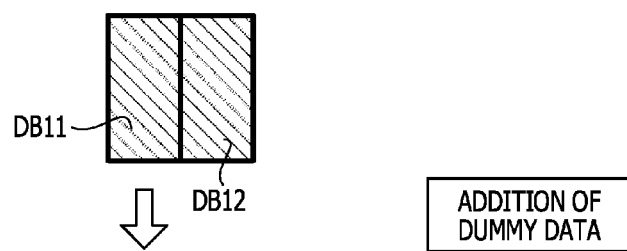

In this modification example, as exemplified in FIG. 14B, if the DBB signal is received from the RE 30 or the REC 10 as the coupled object, the relay device 20-*j* selects the parts DB11 and DB12 as the leading 25% of the DBB signal in the reduction processing. Then, the relay device 20-*j* transmits only the selected parts DB11 and DB12 to another relay device 20-*m* or 20-*n*.

Figure 14C:
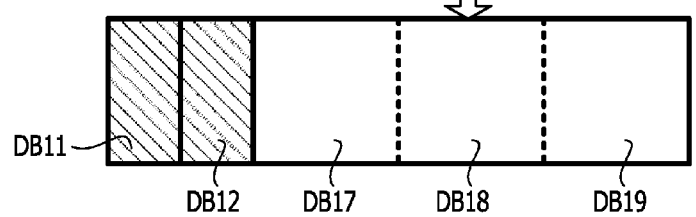

Moreover, as exemplified in FIG. 14C, in the case of transmitting a DBB signal to the RE 30 or the REC 10 as the coupled object, the relay device 20-*j* decides the additional DBB signal DB17 to DB19 in the compensation processing. Furthermore, the relay device 20-*j* adds the decided additional DBB signal DB17 to DB19 to the DBB signal DB11 and DB12 received from another relay device 20-*m* or 20-*n* in the compensation processing. Then, the relay device 20-*j* transmits the DBB signal DB11, DB12, and DB17 to DB19 resulting from the addition to the RE 30 or the REC 10 as the coupled object in the compensation processing. In the present example, the additional DBB signal DB17 to DB19 is the same as the dummy data DB13 to DB15 in FIG. 14A.

Functions of the relay device interface units 201 and 203, the switching unit 202, and the RE/REC interface units 207 to 209 may be implemented by a programmable logic circuit device (e.g. PLD or FPGA). Functions of the control unit 204 may be implemented by a general-purpose processor such as a CPU.

The transmission and reception of the control signal between the relay devices 20 may be carried out via a communication link established between the relay devices 20 in accordance with a given communication protocol (e.g. HDLC).

(Operation)

An operation of the radio communication system 1 will be described with reference to FIGS. 15 to 21.

A case will be assumed in which the RE 30-1 is newly coupled to a port included in the relay device 20-6. In this case, the relay device 20-6 detects that the RE 30-1 is newly coupled (step S101 in FIG. 15 and (1) in FIG. 16).

Subsequently, the relay device 20-6 informs the other relay devices 20-1 to 20-5 of the coupling change notification exemplified in FIG. 3 ((2) in FIG. 16). Thus, the relay devices 20-1 to 20-3 each receive the coupling change notification and transmit the coupling change notification to the RECs 10-1 to 10-3, respectively, via the respective ports to which the RECs 10-1 to 10-3 are coupled (step S102 in FIG. 15 and (3) in FIG. 16).

Thus, each of the RECs 10-1 to 10-3 receives the coupling change notification on each port basis. In this case, the respective RECs 10-1 to 10-3 execute processing exemplified in FIG. 17 on each port basis.

Figure 17:
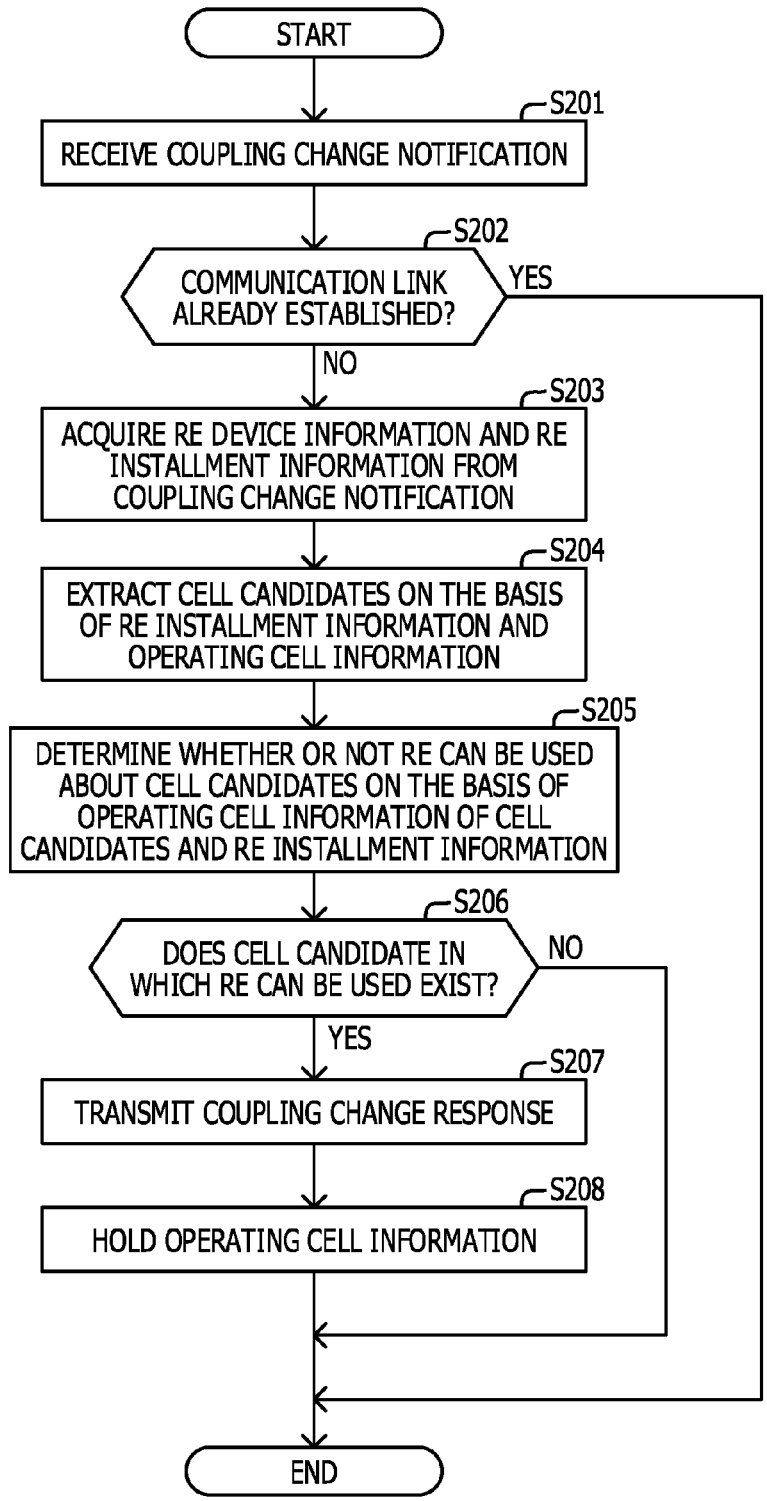
FIG. 17 is a flowchart representing one example of processing executed by the REC illustrated in FIG. 1.

First, the REC 10-*i* receives the coupling change notification (step S201 in FIG. 17). Subsequently, the REC 10-*i* determines whether or not a communication link has been already established about the port used for the reception of the coupling change notification (step S202 in FIG. 17).

If a communication link has been already established, the REC 10-*i* makes a determination of "Yes" and ends the processing of FIG. 17 without transmitting a coupling change response. If making the determination of "Yes," the REC 10-*i* may transmit a coupling change response indicating a negative response to the coupling change notification.

If a communication link has not yet been established, the REC 10-*i* makes a determination of "No" and acquires RE device information and RE installment information from the received coupling change notification (step S203 in FIG. 17).

Subsequently, the REC 10-*i* extracts cell candidates composed of cells at positions corresponding to the installment position included in the RE installment information on the basis of the acquired RE installment information and operating cell information (step S204 in FIG. 17). Then, the REC 10-*i* determines whether or not the RE 30 can be used about each of the extracted cell candidates on the basis of the operating cell information of the cell candidates and the RE device information (step S205 in FIG. 17).

Subsequently, the REC 10-*i* determines whether or not cell candidate about which it is determined that the RE 30 can be used exists (step S206 in FIG. 17).

If the cell candidate about which it is determined that the RE 30 can be used does not exist, the REC 10-*i* makes a determination of "No" and ends the processing of FIG. 17 without transmitting a coupling change response. If making the determination of "No," the REC 10-*i* may transmit a coupling change response indicating a negative response to the coupling change notification.

If the cell candidate about which it is determined that the RE 30 can be used exists, the REC 10-*i* makes a determination of "Yes" and transmits a coupling change response to the relay device 20 as the coupled object (step S207 in FIG. 17). Then, the REC 10-*i* holds the operating cell information of the cell candidate about which it is determined that the RE 30 can be used (step S208 in FIG. 17). Subsequently, the REC 10-*i* ends the processing of FIG. 17.

In the present example, a case will be assumed in which the REC 10-3 transmits the coupling change response to the relay device 20-3 via the port identified by PID#3 in the relay device 20-3. Moreover, in the present example, a case will be assumed in which the REC 10-2 transmits the coupling change response to the relay device 20-2 via the port identified by PID#2 in the relay device 20-2.

According to the above-described assumption, the relay device 20-2 determines whether or not the relay device 20 identified by the transmission destination device ID included in a coupling change response exemplified in FIG. 18 is the relay device 20-2. Then, because the relay device 20 identified by the transmission destination device ID is not the relay device 20-2, the relay device 20-2 transmits the coupling change response exemplified in FIG. 18 to the relay device 20-1. Similarly, the relay device 20-1 transmits the coupling change response exemplified in FIG. 18 to the relay device 20-6 (step S103 in FIG. 15 and (4) in FIG. 16).

Furthermore, the relay device 20-3 determines whether or not the relay device 20 identified by the transmission destination device ID included in the coupling change response exemplified in FIG. 4 is the relay device 20-3. Then, because the relay device 20 identified by the transmission destination device ID is not the relay device 20-3, the relay device 20-3 transmits the coupling change response exemplified in FIG. 4 to the relay device 20-2. Similarly, the relay device 20-2 transmits the coupling change response exemplified in FIG. 4 to the relay device 20-1. Similarly, the relay device 20-1 transmits the coupling change response exemplified in FIG. 4 to the relay device 20-6 (step S104 in FIG. 15 and (4) in FIG. 16).

Thus, the relay device 20-6 receives the two coupling change responses. Then, the relay device 20-6 decides the REC 10 and the port as the communication destination of the RE 30-1 by selecting one coupling change response from the received coupling change responses (step S105 in FIG. 15 and (5) in FIG. 16).

In the present example, a case will be assumed in which the relay device 20-6 decides the REC 10-3 and the port identified by PID#3 in the relay device 20-3 as the REC 10 and the port as the communication destination of the RE 30-1.

According to the above-described assumption, the relay device 20-6 transmits the coupling change instruction exemplified in FIG. 5 to the relay device 20-3 via the relay devices 20-1 and 20-2. Thus, each of the relay devices 20-1 to 20-3 receives the coupling change instruction. Each of the relay devices 20-6 and 20-1 to 20-3 updates the coupling information stored by the storing unit 206 on the basis of information included in the coupling change instruction.

Figure 16:
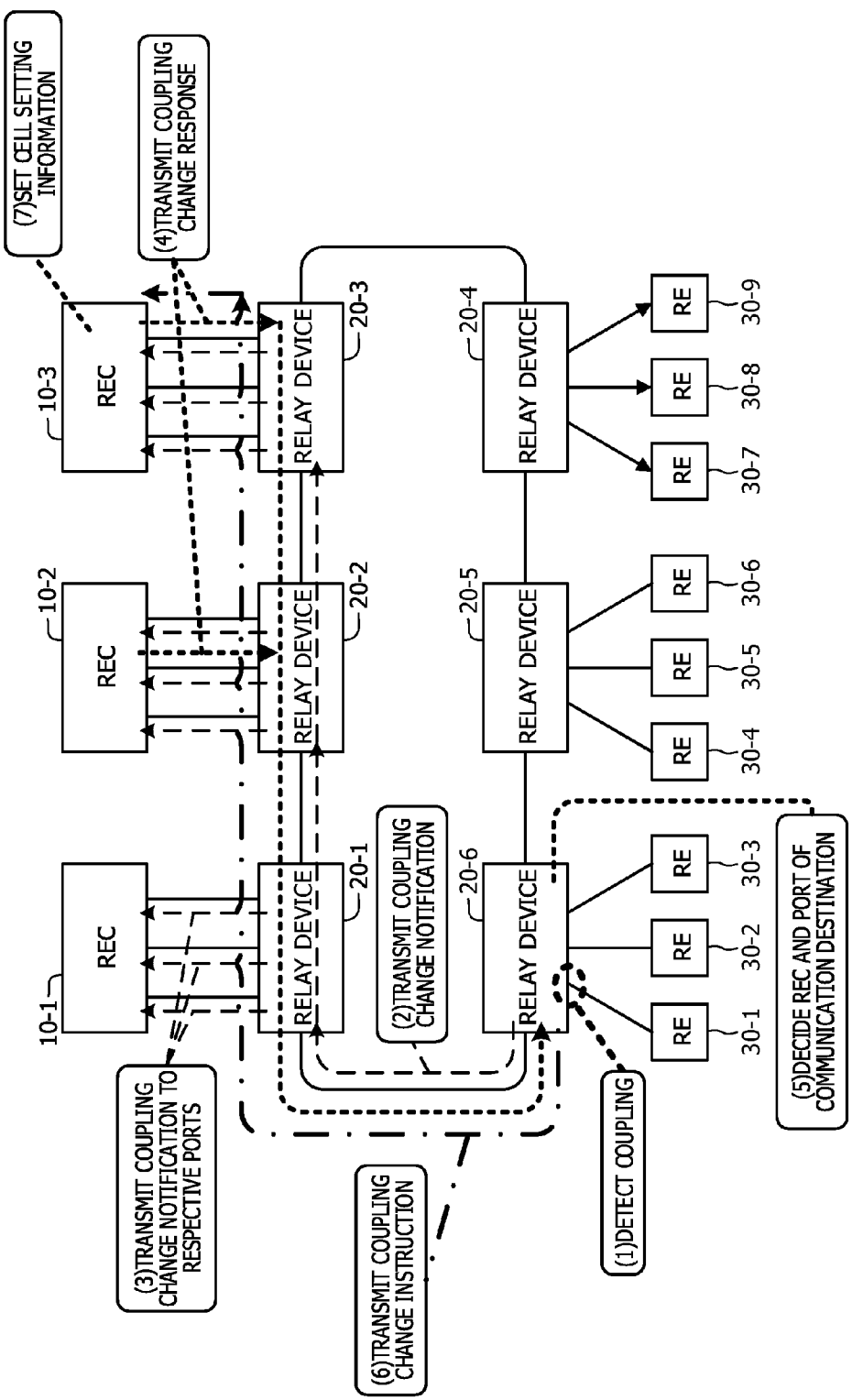
FIG. 16 illustrates one example of an operation of the radio communication system illustrated in FIG. 1.

Then, the relay device 20-3 transmits the coupling change instruction to the REC 10-3 via the port identified by the REC port ID included in the received coupling change instruction (step S106 in FIG. 15 and (6) in FIG. 16). Thus, the REC 10-3 receives the coupling change instruction. In this case, the REC 10-3 executes processing exemplified in FIG. 19.

Figure 19:
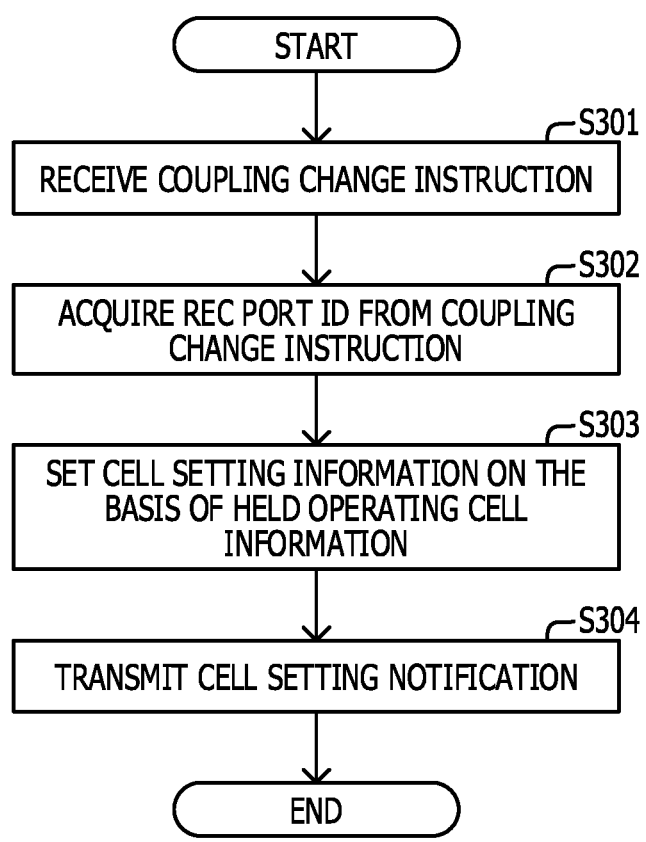
FIG. 19 is a flowchart representing one example of processing executed by the REC illustrated in FIG. 1.

First, the REC 10-3 receives the coupling change instruction (step S301 in FIG. 19). Subsequently, the REC 10-3 acquires an REC port ID from the coupling change instruction (step S302 in FIG. 19). Then, the REC 10-3 sets the cell setting information exemplified in FIG. 6 on the basis of the held operating cell information (step S107 in FIG. 15, (7) in FIG. 16, and step S303 in FIG. 19).

Subsequently, the REC 10-3 transmits a cell setting notification including the set cell setting information to the relay device 20-3 as the coupled object via the port used for the reception of the coupling change instruction (step S304 in FIG. 19). Then, the relay device 20-3 transmits the cell setting notification to the relay device 20-6 (step S108 in FIG. 15). Thus, the relay device 20-6 receives the cell setting notification.

Each of the relay devices 20-3 and 20-6 updates the cell information stored by the storing unit 206 on the basis of the cell setting information included in the cell setting notification. Then, the relay device 20-6 transmits the cell setting information to the RE 30-1 via the port identified by the RE port ID included in the cell setting notification. Thus, the RE 30-1 receives the cell setting information and holds the received cell setting information.

Then, the REC 10-3 transmits and receives user data between the REC 10-3 and the RE 30-1 via the newly-established communication link in accordance with the set cell setting information (step S109 in FIG. 15). This communication link couples the port identified by PID#3 in the relay device 20-3 and the port identified by PID#1 in the relay device 20-6.

In transmission and reception of downlink user data (user data to be transmitted from the RE 30-1 to the UE 50), the relay device 20-3 executes the reduction processing on a DBB signal representing the user data and the relay device 20-6 executes the compensation processing on the DBB signal.

In transmission and reception of uplink user data (user data transmitted from the UE 50 to the RE 30-1), the relay device 20-6 executes the reduction processing on a DBB signal representing the user data and the relay device 20-3 executes the compensation processing on the DBB signal.

Next, a case will be assumed in which the condition relating to the load of the REC 10-2 is satisfied about a communication link established between the port identified by PID#2 in the relay device 20-2 and the RE 30-1. In this case, the REC 10-2 transmits a coupling change request to the relay device 20-2 via this port.

Figure 20:
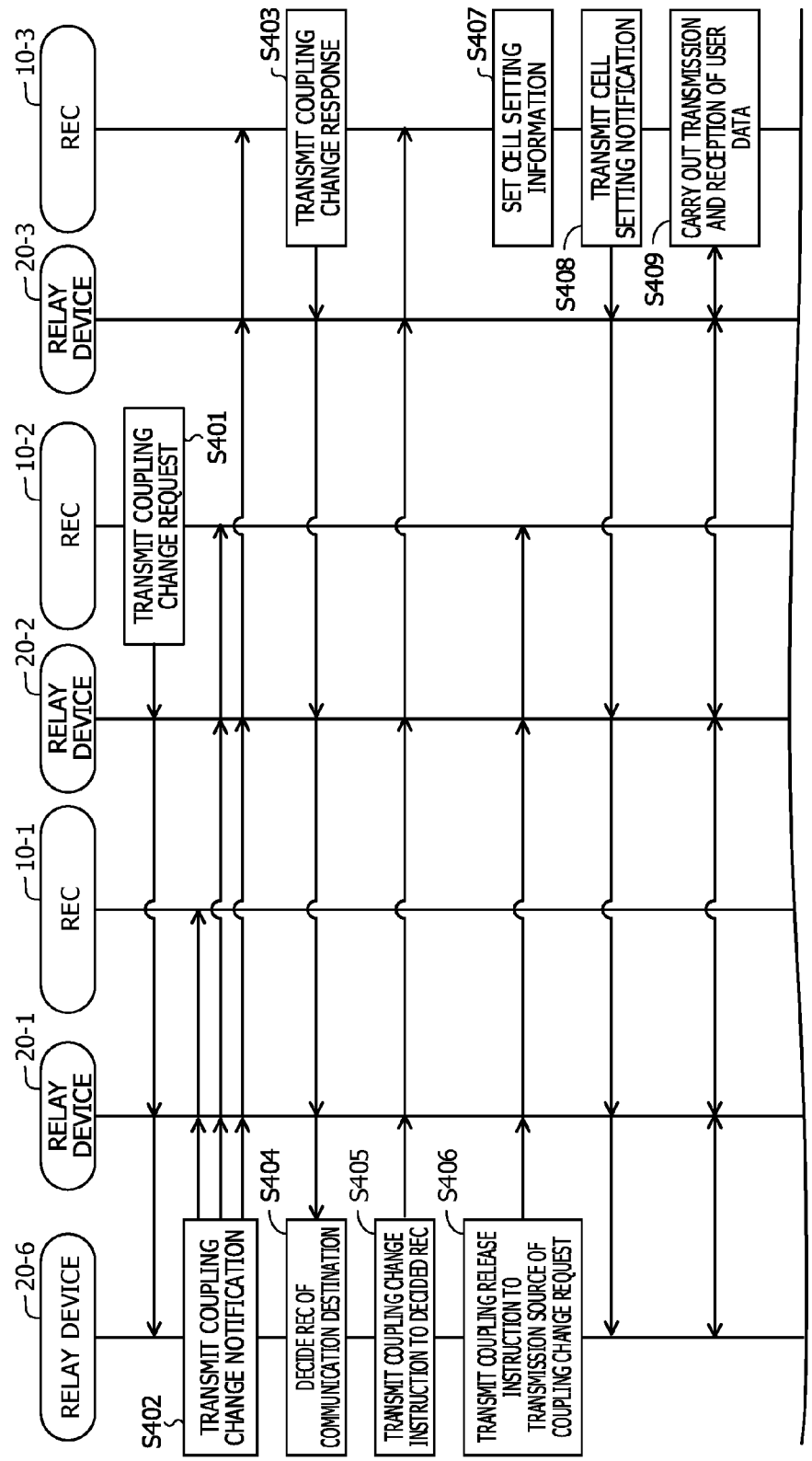
FIG. 20 is a sequence diagram representing one example of an operation of the radio communication system illustrated in FIG. 1.
Figure 21:
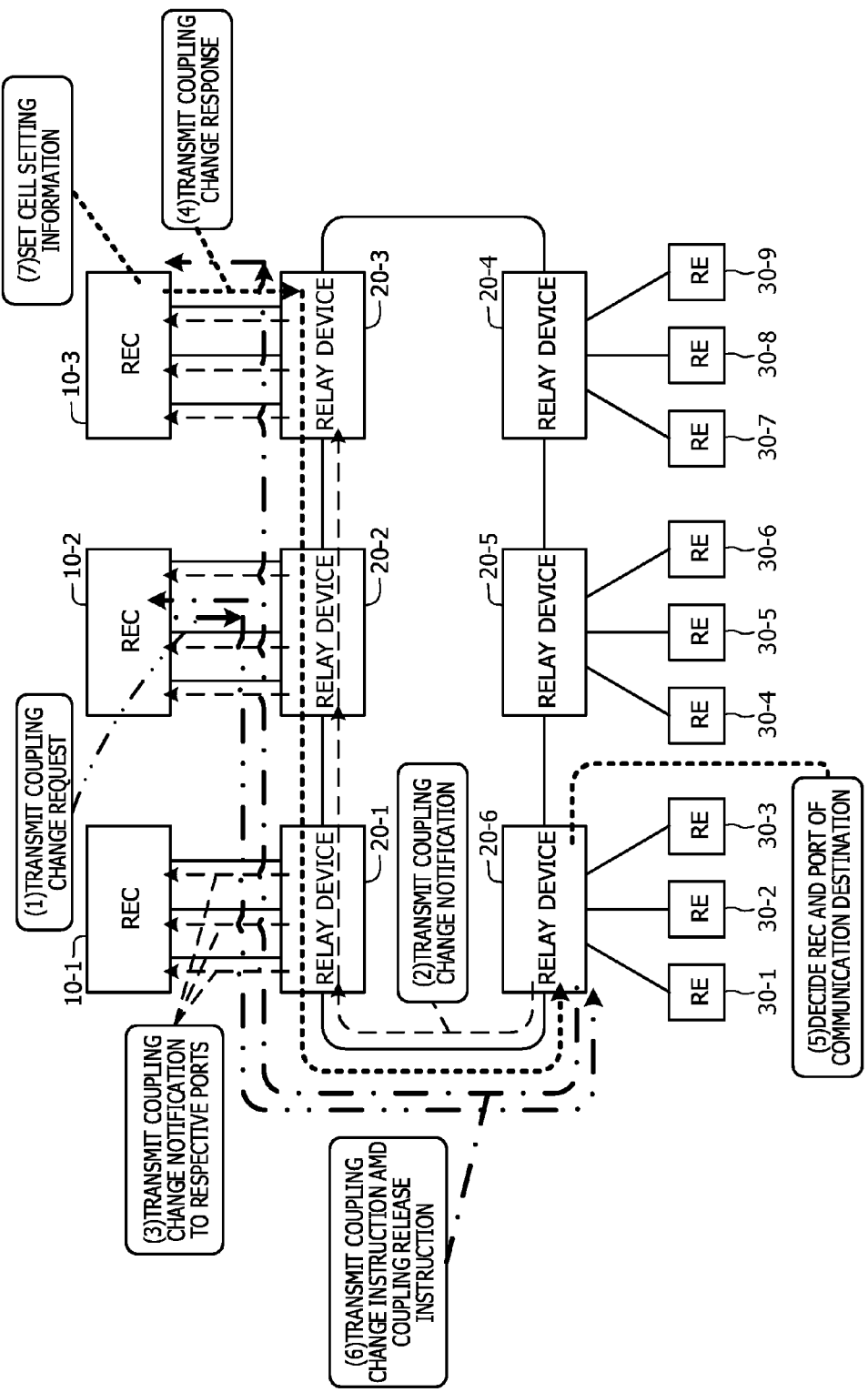
FIG. 21 illustrates one example of an operation of the radio communication system illustrated in FIG. 1.

The relay device 20-2 adds a transmission source device ID, a transmission destination device ID, a signal ID, an RE port ID, and an REC port ID to the received coupling change request and transmits the coupling change request resulting from the addition exemplified in FIG. 9 to the relay device 20-6 to which the RE 30-1 forming the above-described communication link is coupled (step S401 in FIG. 20 and (1) in FIG. 21).

Subsequently, when receiving the coupling change request, the relay device 20-6 creates the coupling change notification exemplified in FIG. 3 and transmits the created coupling change notification to the relay devices 20-1 to 20-5 ((2) in FIG. 21). The transmission of the coupling change notification to the relay devices 20-1 to 20-5 may be expressed as informing of the coupling change notification. Due to this, the relay devices 20-1 to 20-3 each receive the coupling change notification and transmit the coupling change notification to the RECs 10-1 to 10-3, respectively, via the respective ports to which the RECs 10-1 to 10-3 are coupled (step S402 in FIG. 20 and (3) in FIG. 21).

Thus, each of the RECs 10-1 to 10-3 receives the coupling change notification on each port basis. In this case, the respective RECs 10-1 to 10-3 execute the processing exemplified in FIG. 17 on each port basis.

In the present example, a case will be assumed in which the REC 10-3 transmits a coupling change response to the relay device 20-3 via the port identified by PID#3 in the relay device 20-3.

According to this assumption, the relay device 20-3 creates the coupling change response exemplified in FIG. 4 and transmits the created coupling change response to the relay device 20-6 (step S403 in FIG. 20 and (4) in FIG. 21).

Thus, the relay device 20-6 receives the coupling change response. Then, the relay device 20-6 decides the REC 10 and the port as the communication destination of the RE 30-1 on the basis of information included in the received coupling change response (step S404 in FIG. 20 and (5) in FIG. 21).

In the present example, the relay device 20-6 decides the REC 10-3 and the port identified by PID#3 in the relay device 20-3 as the REC 10 and the port as the communication destination of the RE 30-1. Therefore, the relay device 20-6 creates the coupling change instruction exemplified in FIG. 5 and transmits the created coupling change instruction to the relay device 20-3 via the relay devices 20-1 and 20-2. Thus, each of the relay devices 20-1 to 20-3 receives the coupling change instruction. Each of the relay devices 20-6 and 20-1 to 20-3 updates the coupling information stored by the storing unit 206 on the basis of information included in the coupling change instruction.

Then, the relay device 20-3 transmits the coupling change instruction to the REC 10-3 via the port identified by the REC port ID included in the received coupling change instruction (step S405 in FIG. 20 and (6) in FIG. 21).

Moreover, the relay device 20-6 creates a coupling release instruction and transmits the created coupling release instruction to the relay device 20-2 to which the REC 10-2, which is the transmission source of the coupling change request, is coupled via the relay device 20-1. Thus, each of the relay devices 20-1 and 20-2 receives the coupling release instruction. Each of the relay devices 20-6, 20-1, and 20-2 updates the coupling information stored by the storing unit 206 on the basis of information included in the coupling release instruction.

Then, the relay device 20-2 transmits the coupling release instruction to the REC 10-2 via the port identified by the REC port ID included in the received coupling release instruction (step S406 in FIG. 20 and (6) in FIG. 21). Thus, the REC 10-2 receives the coupling release instruction. Then, the REC 10-2 releases the setting of the cell setting information.

The REC 10-3 receives the coupling change instruction. In this case, the REC 10-3 executes the processing exemplified in FIG. 19 and sets the cell setting information exemplified in FIG. 6 on the basis of the held operating cell information (step S407 in FIG. 20 and (7) in FIG. 21).

Subsequently, the REC 10-3 transmits a cell setting notification to the relay device 20-6 via the relay device 20-3 (step S408 in FIG. 20). Thus, the relay device 20-6 receives the cell setting notification.

Each of the relay devices 20-3 and 20-6 updates the cell information stored by the storing unit 206 on the basis of the cell setting information included in the cell setting notification. Then, the relay device 20-6 transmits the cell setting information to the RE 30-1 via the port identified by the RE port ID included in the cell setting notification. Thus, the RE 30-1 receives the cell setting information and holds the received cell setting information.

Then, the REC 10-3 transmits and receives user data between the REC 10-3 and the RE 30-1 via the newly-established communication link in accordance with the set cell setting information (step S409 in FIG. 20).

As described above, the relay device 20-$j$ according to the first embodiment transmits information relating to the RE 30 to the plural RECs 10 and selects one of the plural RECs 10 on the basis of responses to this information from the plural RECs 10. Then, the relay device 20-$j$ establishes a communication link between the RE 30 and the selected REC 10.

This can establish the communication link between the RE 30 and the REC 10 suitable for this RE 30. Furthermore, the use efficiency of the RE 30 and the REC 10 can be enhanced. In addition, the load of the REC 10 can be reduced.

Moreover, when new establishment of a communication link between the RE 30 and the REC 10 is requested, the REC 10 to serve as the communication destination in the communication link can be properly decided.

The relay device 20-$j$ according to the first embodiment stores information relating to a radio link between the RE 30 and the UE 50, set by the REC 10 when a communication link between the REC 10 and the RE 30 is established. The relay device 20-$j$ controls the transmission rate between the relay devices 20 in the communication link on the basis of the information relating to the radio link.

This allows proper control of the transmission rate between the relay devices 20 in the newly-established communication link. Therefore, the new communication link is established while the lowering of the transmission rate in existing communication links is suppressed. In this manner, establishment of a new communication link is facilitated.

Transmission of part of data transmitted between the relay devices 20 may be omitted according to the information relating to the radio link. For example, if the system bandwidth is smaller than a given upper limit, only partial data of data transmitted to the relay device 20-$j$ by the RE 30 or the REC 10 is valid data (e.g. user data) and the other part is given dummy data. Furthermore, for example, if a transmission-reception system in which transmission diversity is executed is used, only partial data of data transmitted to the relay device 20-$j$ by the RE 30 or the REC 10 is valid data and the other part includes data overlapping with the valid data. The overlapping of data may be expressed as correspondence of data.

Therefore, transmission of the data different from the valid data in the data transmitted between the relay devices 20 may be omitted.

In the relay device 20-$j$ according to the first embodiment, the control of the transmission rate between the relay devices 20 includes receiving data from the RE 30 or the REC 10 and selecting partial data from the received data on the basis of the information relating to the radio link in the communication link. Moreover, this control includes transmitting the selected data to another relay device 20-$m$ or 20-$n$ in the communication link.

According to this, the relay device 20-$j$ omits transmission of the data of the part different from the valid data in the data received from the RE 30 or the REC 10. Due to this, the transmission rate between the relay devices 20 in the newly-established communication link is reduced. Therefore, the new communication link is established while the lowering of the transmission rate in existing communication links is suppressed. In this manner, establishment of a new communication link is facilitated.

The relay device 20-$j$ according to the first embodiment receives data from another relay device 20-$m$ or 20-$n$ in the communication link and decides additional data on the basis of the information relating to the radio link. Furthermore, the relay device 20-$j$ transmits data obtained by adding the decided additional data to the received data to the RE 30 or the REC 10 in the communication link.

According to this, data obtained by adding data whose transmission is omitted by another relay device 20-$m$ or 20-$n$ to the data received from this another relay device 20-$m$ or 20-$n$ is transmitted to the RE 30 or the REC 10. This allows the RE 30 to receive the same data as data transmitted by the REC 10 forming the communication link with this RE 30. Furthermore, the REC 10 can receive the same data as data transmitted by the RE 30 forming the communication link with this REC 10.

In the relay device 20-$j$ according to the first embodiment, the information relating to the radio link is set by the REC 10 on the basis of information transmitted from the RE 30 to the REC 10. The RE device information and the RE installment information are one example of the information transmitted from the RE 30 to the REC 10.

According to this, the information relating to the radio link is properly set in the REC 10 according to the information transmitted by the RE 30 whichever RE 30 is selected. As a result, radio communications between the RE 30 and the UE 50 are properly carried out.

The relay device 20-$j$ according to the first embodiment transmits a coupling change notification to request new establishment of a communication link between the RE 30 and the REC 10 to each of at least one REC 10 coupled to the RE 30 via the plural relay devices 20. Furthermore, the relay device 20-$j$ receives coupling change responses transmitted from the RECs 10 in response to the coupling change notification. In addition, the relay device 20-$j$ decides the REC 10 to serve as the communication destination in the communication link on the basis of the received coupling change responses. Moreover, the relay device 20-*j* transmits a coupling change instruction to give an instruction to establish the communication link to the decided REC 10.

According to this, when new establishment of a communication link between the RE 30 and the REC 10 is requested, the REC 10 to serve as the communication destination in the communication link is properly decided.

The relay device 20-*j* according to the first embodiment detects that the RE 30 is newly coupled to the relay device 20-*j* and transmits a coupling change notification in response to the detection of the coupling.

According to this, when the RE 30 is newly coupled to the relay device 20-*j*, new establishment of a communication link between the RE 30 and the REC 10 is rapidly carried out.

The relay device 20-*j* according to the first embodiment receives a coupling change request to request change of the communication destination in a communication link from the REC 10 and transmits a coupling change notification in response to the reception of the coupling change request.

According to this, when change of the communication destination in a communication link is requested, new establishment of a communication link between the RE 30 and the REC 10 is rapidly carried out.

In response to the reception of the coupling change request, the relay device 20-*j* according to the first embodiment transmits a coupling release instruction to give an instruction to release a communication link to the REC 10 as the transmission source of the coupling change request.

According to this, when change of the communication destination in a communication link is requested, release of the communication link is rapidly carried out.

In the above-described embodiment, the reduction processing and the compensation processing are executed in both uplink and downlink. However, the reduction processing and the compensation processing may be executed in only one of uplink and downlink.

Figure 22:
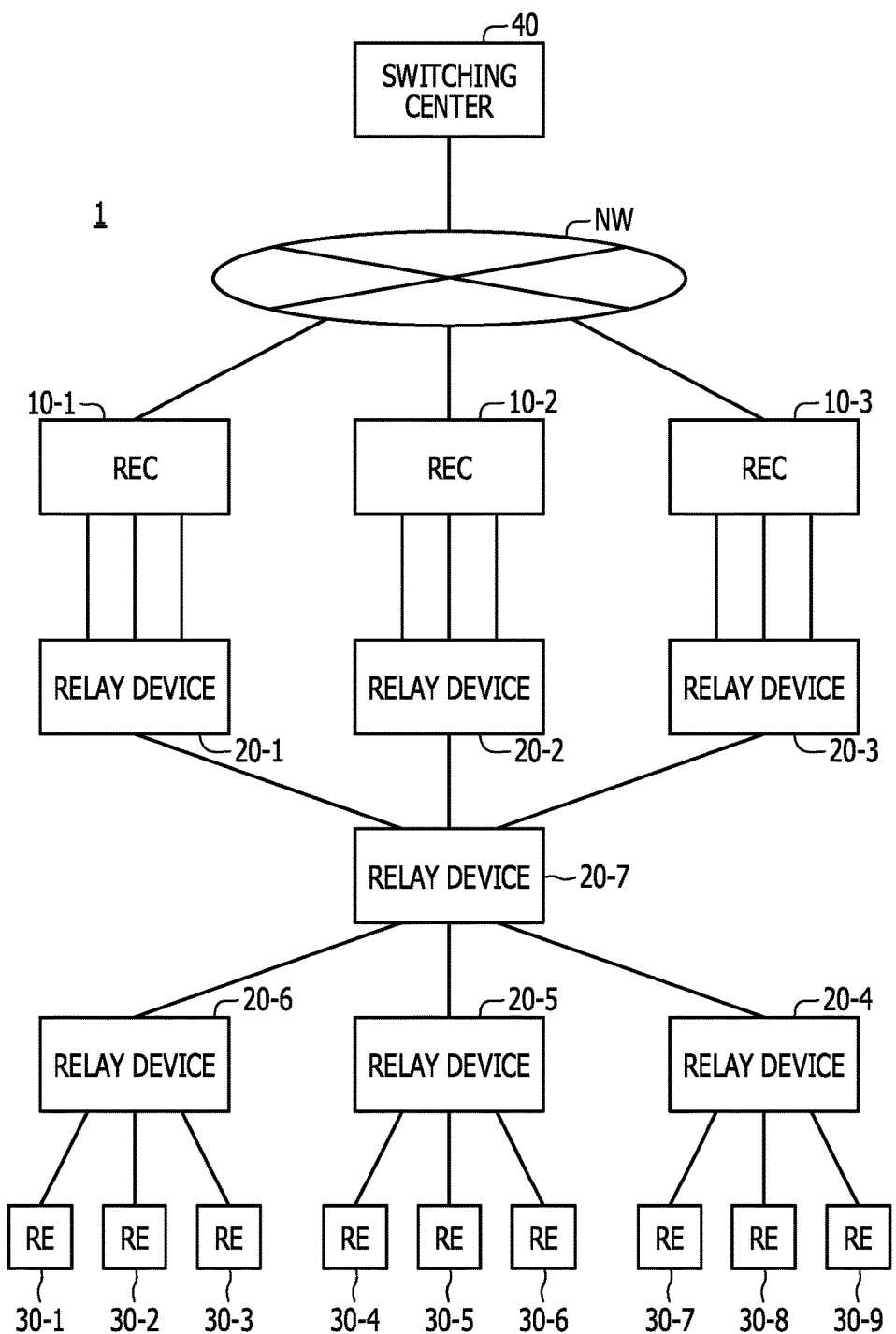
FIG. 22 illustrates one example of a configuration of a radio communication system according to a modification example.

As exemplified in FIG. 22, the plural relay devices 20 may be coupled into a star shape. Furthermore, the plural relay devices 20 may be coupled to include a network topology of a shape (e.g. mesh shape) different from the ring shape and the star shape.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A relay device configured to be coupled to a control device, the control device storing first information indicating a first condition regarding a position of a wireless device which is to be coupled to the control device via the relay device and is to communicate with a terminal device, and second information indicating a second condition regarding performance of the wireless device, the relay device comprising:

a memory; and a processor coupled to the memory and configured to:

receive, from the wireless device, device information including the performance of the wireless device and installment information including a position where the wireless device is located, transmit, to the control device, the device information and the installment information, receive a response from the control device when the position where the wireless device is located satisfies the first condition and the performance of the wireless device satisfies the second condition, establish a communication link between the wireless device and the control device, after receiving the response from the control device, and control, based on a link information indicating a wireless communication link between the wireless device and the terminal device, a transmission rate in the communication link between the wireless device and the control device.

2. The relay device according to claim 1, wherein the second information includes information on at least one of: a size of a cell, a cell ID, a frequency band, a system bandwidth, a number of antennas, a transmission-reception system, and a transmission power.

3. The relay device according to claim 2, wherein the second information is determined to be satisfied when (i) the frequency band included in the second information includes a frequency band included in the device information, (ii) the system bandwidth included in the second information includes a system bandwidth included in the device information, (iii) the number of antennas included in the second information is greater than or equal to a number of antennas included in the device information, (iv) the transmission power included in the second information is greater than or equal to a transmission power included in the device information, and (v) the number of antennas included in the device information is greater than or equal to two if a transmission-reception system included in the second information comprises a system with transmission diversity.

4. The relay device according to claim 1, wherein:

the control device is configured to execute baseband processing, and the wireless device includes an amplifier configured to amplify a radio signal based on a signal received from the control device and transmit the amplified radio signal via an antenna to one or more terminal devices.

5. The relay device according to claim 1, wherein the processor is further configured to:

receive data from the control device or the wireless device using the wireless communication link, select a portion of the received data based on the link information, and transmit the portion of the received data to another relay device which is coupled to the relay device and the control device using the wireless communication link.

6. The relay device according to claim 1, wherein the processor is further configured to:

receive data from another relay device using the wireless communication link, determine additional data based on the link information, and transmit the additional data and the portion of the received data to the control device or the wireless device using the wireless communication link.

7. The relay device according to claim 1, wherein the link information indicates a system bandwidth, a transmission-reception system of a wireless signal, or a combination thereof.

8. The relay device according to claim 1, wherein the link information is set by the control device based on the wireless device information transmitted from the wireless device to the control device.

9. The relay device according to claim 1, wherein the processor is further configured to:
    detect that the wireless device is newly coupled to the relay device, and
    transmit the device information in response to the detection of the coupling of the wireless device.

10. The relay device according to claim 1, wherein the processor is further configured to:
    receive a coupling change request that is transmitted by the control device and is to request a change of a communication destination in the communication link, and
    transmit the device information in response to the reception of the coupling change request.

11. The relay device according to claim 10, wherein the processor is further configured to transmit a coupling release message instructing the control device to release the communication link in response to the reception of the coupling change request.

12. A communication system comprising:
    a wireless device;
    a control device storing first information indicating a first condition regarding a position of a wireless device which is to be coupled to the control device via the relay device and is to communicate with a terminal device and second information indicating a second condition regarding performance of the wireless device; and
    a first relay device coupled to the wireless device and the control device,
    wherein:
    the first relay device is configured to receive, from the wireless device, device information indicating performance of the wireless device and installment information indicating a position where the wireless device is located,
    the first relay device is configured to transmit the device information and the installment information to the control device,
    the control device is configured to determine whether the position where the wireless device is located satisfies the first condition and whether the performance of the wireless device satisfies the second condition,
    when the position of the wireless device satisfies the first condition and the performance of the wireless device satisfies the second condition, the control device is configured to transmit a response to the first relay device,
    the first relay device is configured to receive the response,
    the first relay device is configured to establish a communication link between the wireless device and the control device based on the received response, and
    the first relay device is configured to control, based on a link information indicating a wireless communication link between the wireless device and the terminal device, a transmission rate in the communication link between the wireless device and the control device.

13. The communication system according to claim 12, wherein the second information includes at least one of: a size of a cell, a cell ID, a frequency band, a system bandwidth, a number of antennas, a transmission-reception system, and a transmission power.

14. The communication system according to claim 12, further comprising:
    a second relay device coupled to the first relay device and the control device, wherein each of the first relay device and the second relay device includes a memory device that stores the link information, set by the control device when the communication link is established,
    the first relay device is configured to:
        receive data from the wireless device using the communication link,
        select a portion of the received data based on the link information, and
        transmit the portion of the received data to the second relay device using the communication link, and
    the second relay device is configured to:
        receive the portion of the received data from the first relay device,
        determine additional data based on the link information, and
        transmit the additional data and the portion of the received data to the control device using the communication link.

15. The communication system according to claim 14, wherein the link information indicates a system bandwidth, a transmission-reception system of a wireless signal, or a combination thereof.

16. The communication system according to claim 14, wherein the link information is set by the control device based on the device information transmitted from the wireless device to the control device.

17. The communication system according to claim 12, wherein the first relay device is configured to:
    detect that the wireless device is newly coupled to the first relay device, and
    transmit the device information in response to the detection of the coupling of the wireless device.

18. The communication system according to claim 12, wherein:
    the second relay device is configured to:
        receive a coupling change request that is transmitted by the control device and is to request a change of a communication destination in the communication link, and
        transmit the coupling change request to the first relay device, and
    the first relay device is configured to:
        receive the coupling change request, and
        transmit the device information in response to the reception of the coupling change request.

19. A communication method using a communication system including a wireless device, a control device storing first information indicating a first condition regarding a position of a wireless device which is to be coupled to the control device via the relay device and is to communicate with a terminal device and second information indicating a second condition regarding performance of the wireless device, and a first relay device coupled to the wireless device and the control device, the communication method comprising:
    receiving, by the first relay device from the wireless device, device information indicating performance of the wireless device and installment information indicating a position where the wireless device is located;
    transmitting, by the first relay device to the control device, the device information and the installment information;

determining, by the control device, whether the location where the wireless device satisfied the first condition and the performance of the wireless device satisfies the second condition;

transmitting, by the control device, a response to the first relay, device when the position of the wireless device satisfies the first condition and the performance of the wireless device satisfies the second condition;

establishing, by the first relay device, a communication link between the wireless device and the control device; and controlling, by the first relay device, based on a link information indicating a wireless communication link between the wireless device and the terminal device, a transmission rate in the communication link between the wireless device and the control device.

20. A relay device coupled to a control device, the control device storing a first condition relating to a load on the control device and a second condition relating to performance of a wireless device that is to be coupled to the control device via the relay device and is to communicate with a terminal device, the relay device comprising:

a memory; and a processor coupled to the memory and configured to:

when the first condition is satisfied at the control device, receive a coupling change request from the control device, transmit, to the control device, device information indicating the performance of the wireless device coupled to the relay device, when the performance of the wireless device indicated by the device information satisfies the second condition at the control device, receive a response from the control device for transmitting the device information, and establish a communication link between the wireless device and the control device in response to the response from the control device, and control, based on a link information indicating a wireless communication link between the wireless device and the terminal device, a transmission rate in the communication link between the wireless device and the control device.

21. The relay device according to claim 20, wherein the first condition is determined to be satisfied at the control device when (i) a number of wireless terminal devices coupled to the control device is greater than a first threshold, (ii) an amount of communication traffic per unit time via the control device is greater than or equal to a second threshold, or (iii) when a processing load of the control device is greater than or equal to a third threshold.

22. The relay device according to claim 20, wherein the second condition is determined to be satisfied when (i) a frequency band included in the second condition includes a frequency band included in the device information, (ii) a system bandwidth included in the second condition includes a system bandwidth included in the device information, (iii) a number of antennas included in the second condition is greater than or equal to a number of antennas included in the device information, (iv) a transmission power included in the second condition is greater than or equal to a transmission power included in the device information, and (v) a number of antennas included in the device information is greater than or equal to two if a transmission-reception system included in the second condition comprises a system with transmission diversity.

* * * * *